US008875625B2

(12) United States Patent
Siebenga

(10) Patent No.: US 8,875,625 B2
(45) Date of Patent: Nov. 4, 2014

(54) CONTINUOUS SQUARE BALER

(71) Applicant: Charles Siebenga, Belgrade, MT (US)

(72) Inventor: Charles Siebenga, Belgrade, MT (US)

(*) Notice: Subject to any disclaimer, the term of this patent is extended or adjusted under 35 U.S.C. 154(b) by 0 days.

(21) Appl. No.: 14/072,013

(22) Filed: Nov. 5, 2013

(65) Prior Publication Data

US 2014/0123862 A1    May 8, 2014

Related U.S. Application Data

(60) Provisional application No. 61/722,473, filed on Nov. 5, 2012.

(51) Int. Cl.
| | |
|---|---|
| *A01F 15/10* | (2006.01) |
| *A01F 15/08* | (2006.01) |
| *A01F 15/14* | (2006.01) |

(52) U.S. Cl.
CPC .............. *A01F 15/10* (2013.01); *A01F 15/0858* (2013.01); *A01F 15/14* (2013.01)
USPC ........ 100/40; 100/3; 100/4; 100/7; 100/19 R; 100/33 R; 100/76; 100/80; 100/179; 100/188 R; 56/341

(58) Field of Classification Search
USPC .......... 100/3, 4, 7, 19 R, 20, 21, 33 R, 35, 40, 100/76, 77, 78, 80, 81, 83, 84, 178, 179, 100/188 R, 189; 56/341, 343
See application file for complete search history.

(56) References Cited

U.S. PATENT DOCUMENTS

| | | | | |
|---|---|---|---|---|
| 1,494,007 | A | * | 5/1924 | Murray .......................... 100/187 |
| 3,922,838 | A | * | 12/1975 | Kline et al. ...................... 56/344 |
| 4,273,034 | A | * | 6/1981 | Molitorisz ......................... 100/8 |
| 4,455,930 | A | | 6/1984 | Crawford |
| 4,490,968 | A | | 1/1985 | Cysewski |
| 4,803,832 | A | * | 2/1989 | Crawford ......................... 56/341 |
| 4,926,749 | A | * | 5/1990 | Neale et al. .................... 100/177 |

* cited by examiner

*Primary Examiner* — Jimmy T Nguyen
(74) *Attorney, Agent, or Firm* — Waters & Oppenhuizen PLC; John A. Waters

(57) ABSTRACT

An improved baler designed in such a way as to allow for the continuous compression of foraged material and the ability to tie off rectangular bales without stopping a continuous compression mechanism within the baler. The baler includes a semi cylinder that moves up and down to compress the foraged material in the compression area while at the same time more material is added by a feeding apparatus above and below the semi cylinder during the down and up motions of the cylinder. The baler also includes a separate area for storing uncompressed material while other material is being compressed and tied off. A computer is included to monitor and control the process.

14 Claims, 26 Drawing Sheets

CONTINUOUS SQUARE BALER

CROSS REFERENCE TO RELATED APPLICATIONS

This application is a non-provisional application of and claims the priority of U.S. Provisional Application No. 61/722,473, filed Nov. 5, 2012, the entire disclosure of which is incorporated herein by reference for all purposes.

FIELD OF THE INVENTION

This invention relates to balers and more particularly, to crop pickup balers and the manner in which crop material is loaded into the bale chamber of such machines and a method of compressing the hay into the final bale chamber while the bale is being formed. The invention also relates to a way of integrating the tying mechanism with the compression mechanism and the feeding mechanisms in such a manner as to allow for the continuous forward motion of the baler throughout the tying cycle.

BACKGROUND OF THE INVENTION

In the present state of the art of baling large rectangular bales, most balers employ a large plunger equal in size to the end dimensions of the bale. This plunger compresses the full volume of hay, comprised of the plunger dimensions multiplied by the thickness of the leaf of hay, in approximately 10% of the plunger's cycle time. This requires a large amount of horsepower during the time the plunger is actually compressing hay and therefore a flywheel is employed to even out the power requirements throughout the cycle of the plunger. The cyclical power requirements of the plunger also require the baler to have enough mass to hold the machine together to absorb the peak power requirement of the plunger.

A round baler can make a cylindrical bale of hay of approximately the same volume, density and rate as that of a square baler, however, the round baler can weigh up to 50% less as compared to a square baler due to the fact that it compresses the hay continuously. There have been a number of attempts to make a machine that would make a square bale of hay using some form of mechanism to continuously compress the hay into the final bale chamber. U.S. Pat. No. 4,490,968 by Jerome M. Cysewski attempted this by having a vertical bale chamber that rocked fore-and-aft over two stationary rollers. With this methodology, after the bale was formed, the bale would be tied off like a square baler and ejected similar to a round baler. Massey Corporation also attempted to make a continuous compression baler by having two rollers move vertically up and down the forward end of the bale in a stationary horizontal bale chamber. Neither of these methods proved to be an efficient or effective way to create a bale of hay. The problems with these methods included, but were not limited to, issues with feeding the hay to the compression rollers, tying off of the bale, the control of the mechanisms by the computer, and the momentum of the rocking bale chamber.

An additional problem in the prior art is found in the tying off process used in most square balers. Most large square balers require two knots per tying cycle because of the extreme back pressure needed for operation due to the cyclical compression of hay by the plunger. This extreme back pressure often causes the twine to slip out of the knotters so the next bale cannot be tied.

SUMMARY OF THE INVENTION

The objective of the present invention is to create a large square baler that will continuously compress hay with only a slight break in the compression of the hay while the bale in the bale chamber is being tied off in a modified version of the conventional method of most square balers. This method of tying off involves bringing up a set of needles from the bottom of the bale chamber, delivering the twine to the knotters over the forward face of the bale, the knotters tying the ends of the twine together with a single knot, and the knotters continuing to hold one end of the twine as the needles retract to their home position. A single knot per tying cycle concept of the present invention simplifies the operation and maintenance of the tying mechanism. A continuous compression concept of this invention also substantially reduces the need for back pressure in the bale chamber, which, in turn, reduces the mass needed to hold the baler together and allows for the single knot tying system.

To achieve the foregoing objectives an important feature of this invention is the semi cylindrical compression roller that is moved vertically up and down the distance of the height of the bale across the forward end of the bale chamber. The curved distance of this semi cylinder is equal to the height of the bale in the bale chamber. The semi circle is constrained to force the curved part of the semi cylinder to roll in sync with the forward end of the bale as the semi cylinder is moved up and down. The driving mechanism to lift and lower the semi cylinder is a crank arm above the semi cylinder. The circular motion of the crank arm allows for enough time to place a half a leaf into the compression area above the semi cylinder and below the semi cylinder. When the semi cylinder is down and a half a leaf of crop is placed above it, the semi cylinder moves upward to compress the half a leaf into the bale chamber forming the top half of the bale. When the semi cylinder is up and a half a leaf of crop is placed below it, the semi cylinder moves down to compress the half a leaf in the bale chamber forming the bottom half of the bale. Generally, a leaf of hay usually refers to the quantity of hay necessary to form a one inch thick compressed layer when the hay is added to the bale chamber. For example, in a bale chamber designed to make bales three feet high by four feet wide, a leaf of hay would be enough to make a three feet by four feet by one inch layer of compressed hay.

Another important feature of this invention is the apparatus that places a half a leaf of crop into the compression area for the semi cylinder to compress the half leaf into the bale chamber. This is accomplished by creating a continuous leaf forming chamber in the middle of the height of the bale being formed, with the continuous leaf forming chamber being of a small enough thickness to allow the half a leaf to be placed into the compression area without ever moving the continuous leaf forming chamber. Crop material is forced into the continuous leaf forming chamber the same way it is forced into the continuous leaf forming chamber of other large square balers, with at least one major exception. Instead of the packer fingers pushing the hay down and backward from the pickup, they rotate in the opposite direction pushing the hay up and backward into the horizontal continuous leaf forming chamber aligned with the middle of the forward end of the bale. This horizontal continuous leaf forming chamber is the same width as the bale being made and its length is at least equal to the height of the bale. This length allows for the storage of a half a leaf of crop when the baler ties the bale off. The crop is pushed into the compression area by a number of flaker fingers equal to the number of knotters the baler has. These flaker fingers engage the hay at the appropriate time so as to push a half a leaf of crop into the compression area every time the roller is in the up or down position. They push the crop forward enough so that the semi cylinder will engage the half a leaf and compress it into the bale chamber. The flaker fingers are aligned with the grooves in the semi cylinder so they can push the hay more rearward in to the compression area.

Another feature of the present invention is that the flaker fingers are pivotally connected to a cart that moves them forward to a position where they will not collide with the center of the semi cylinder but far enough forward to allow the semi cylinder to engage the hay and compress it into the bale chamber. The cart also moves the flaker fingers rearward, far enough to engage a full leaf of hay. The flaker fingers are moved pivotally on the flaker cart so that as they are being moved forward they can engage into the continuous leaf forming chamber and push part of the continuous leaf being formed by the continuous leaf forming chamber into the compression area above or below the semi cylinder. A computer determines when to engage the flaker fingers so that they can take a half a leaf and place it in the compression area. At times the computer will engage the flaker fingers early or later so as to move more or less than a half a leaf of hay into the compression area. This may necessary when, for example, sensors in the baler chamber determine that there is too much hay in the top half of the chamber relative to the bottom half of the chamber or vice versa. The flaker fingers will pivot out of the continuous leaf forming chamber so as to not engage any of the hay as they are being moved rearward by the flaker cart.

Yet another feature of the present invention is that the half a leaf being pushed into the compression area is separated from the continuous leaf being formed in the continuous leaf forming chamber by fingers coming up from the bottom of the continuous leaf forming chamber in front of the semi cylinder. These separator fingers engage the continuous leaf just as the flaker fingers go by to separate the half a leaf being pushed into the compression area from the continuous leaf being formed by the continuous leaf forming chamber. They stay in the continuous leaf forming chamber until another half a leaf needs to be pushed into the compression area. Then they are retracted so as to allow the half a leaf be pushed into the compression area and then reengage as the flaker fingers pass by.

Yet another feature of this invention is the rake fingers which hold the half a leaf in place so the semi cylinder can compress it into the bale chamber. The rake fingers are positioned below and above the continuous leaf forming chamber in such a way as to fit in the grooves of the semi cylinder on its way up or down, and then move out of the way as the semi cylinder presses the hay into the bale chamber. This causes the hay to be forced into the bale chamber by the semi cylinder.

Yet another feature of the invention is a computer that monitors the speed at which the continuous leaf is being formed in the continuous leaf forming chamber and controls when the flaker fingers engage the continuous leaf as the flaker cart pushes them forward. The computer will determine how much hay should be placed in the compression area by reading the pressure on the load cells connected in line with the linkage that connects the crank arm and semi cylinder. The computer will also tell the operator of the tractor to increase or decrease the ground speed of the baler based on how fast the continuous leaf is being formed. The computer will determine from the reading of the load cells whether the operator of the tractor should drive left or right of the windrow in order to make a square bale. The computer will know how long the bale is being formed in the bale chamber by a sensor on the star wheel which rotates as the bale is being formed. When the bale is to the predetermined length, the computer will send a signal to release the tying clutch assembly to engage when the semi cylinder is on its way up. The tying clutch will rotate the needle drive shaft and the knotter drive shaft through one revolution as the crank arm for the semi cylinder makes a half a revolution on the top half of its rotation. The synchronization of these components allows the needles to pass through the grooves of the semi cylinder with continuous motion of both mechanisms. Generally, in one embodiment, during the downstroke of the needles the flaker fingers remain disengaged from the hay such that the hay does not impede the movement of the needles.

These and other features of the present invention will be more fully understood following a review of the specification and drawings.

DETAILED DESCRIPTION OF A PREFERRED EMBODIMENT OF THE INVENTION

Figure 1:
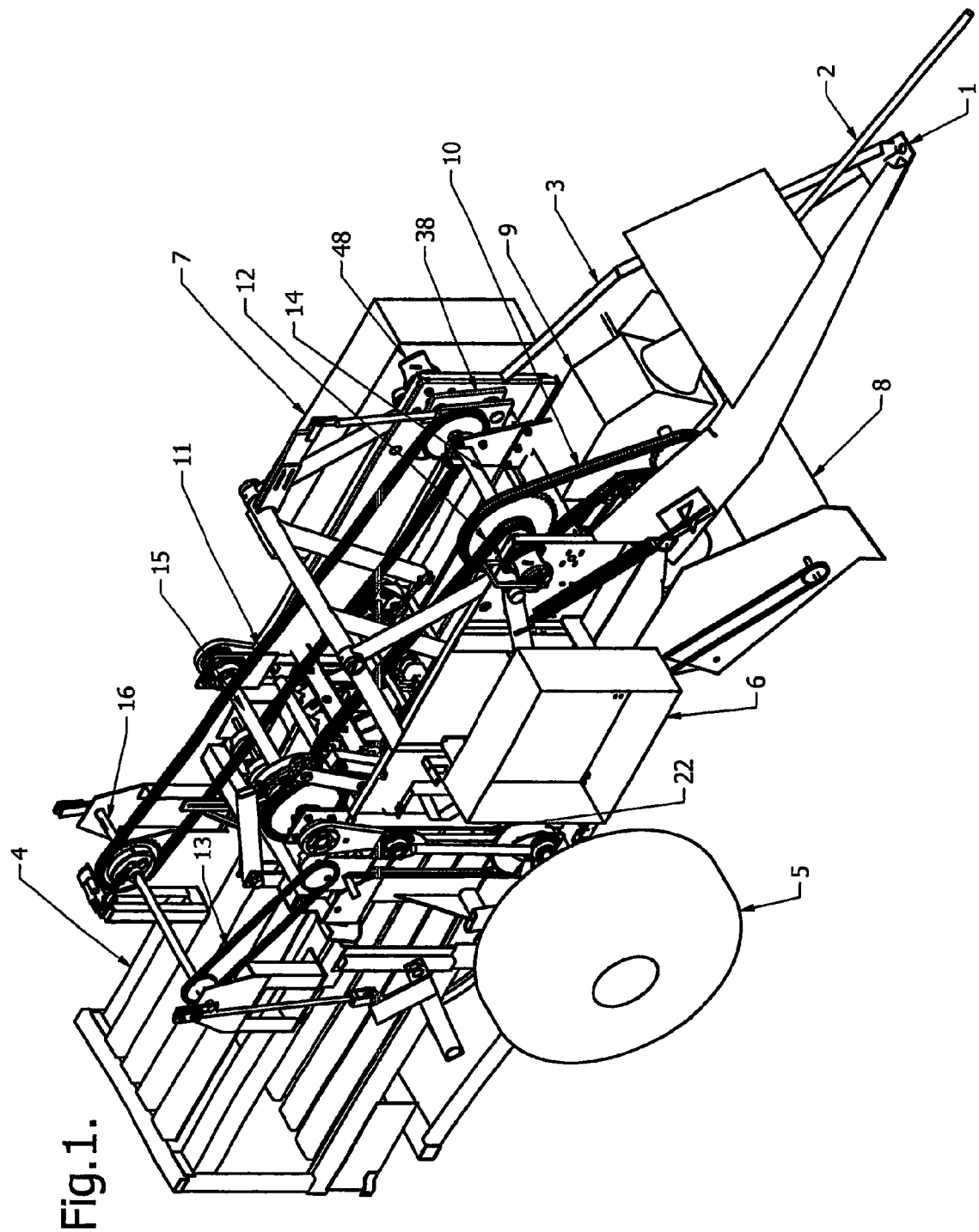
FIG. 1 is an isometric view of the baler of the present invention showing the major structures of the baler.
Figure 2:
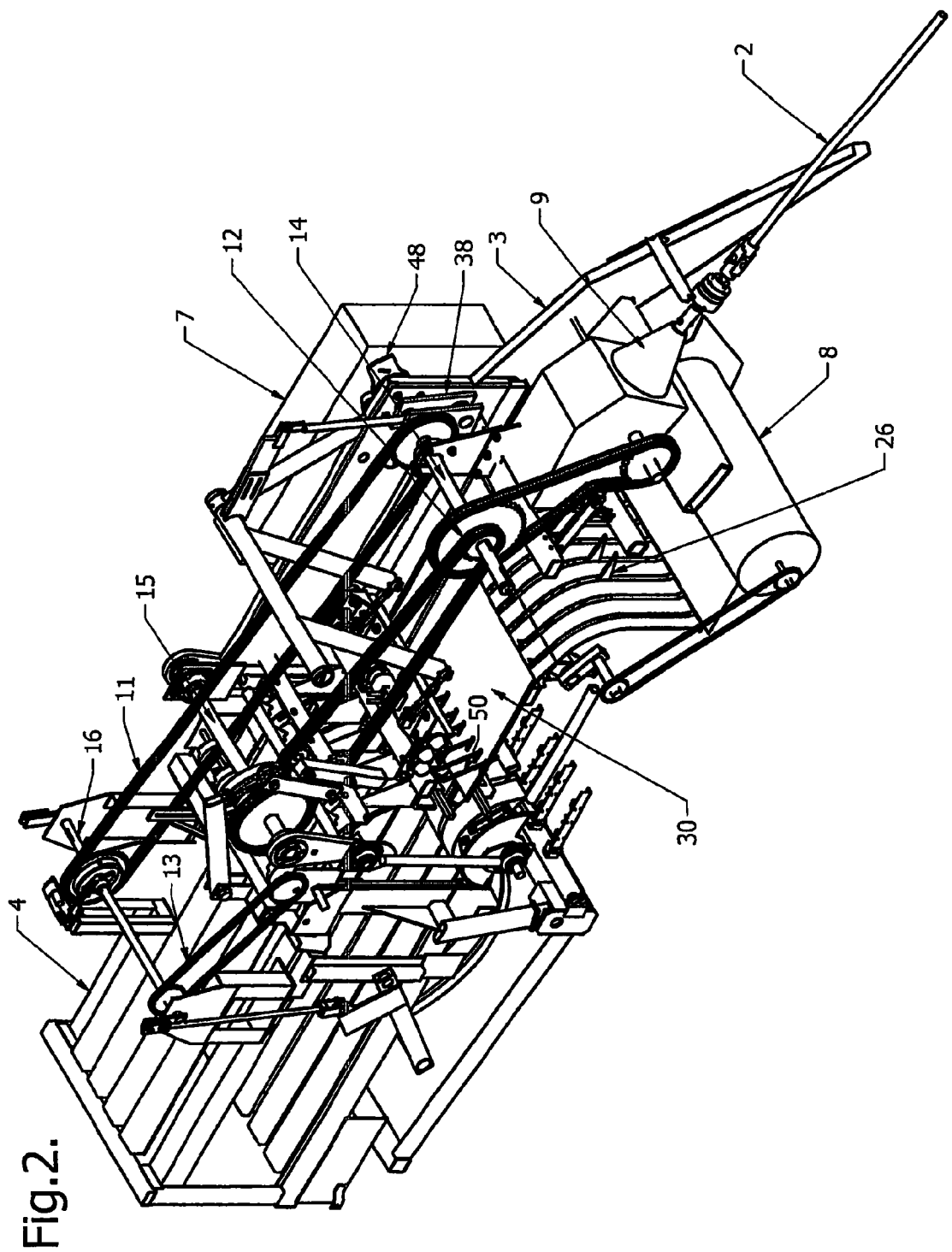
FIG. 2 is an isometric view of the baler with the structural component on one side removed to reveal major moving mechanisms that are unique to this baler.

Referring to the drawings, FIGS. 1 and 2 show views of the baler of the present invention. The baler is comprised of hitch 1 which is use to connect the baler to a powered wheeled vehicle of enough power to pull the baler through a field at a forward speed sufficient to place enough hay in front of the baler to cause it to pick up the hay and create uniform bales. The connection of the baler to the powered wheeled vehicle is at a single point at the forward end of the hitch. The powered wheeled vehicle should have an output shaft with enough power to turn the driveline 2 at enough speed and torque to operate all the functions on the baler. The hitch 1 is long enough and narrow enough to allow for the turning of the pulling vehicle and to connect to the forward end of the structural components on the baler. The baler is also composed of structural components 3 of substantial strength and length so as to be capable of holding the continuous leaf forming chamber 30 and the pickup 8 and connecting the rear of the structure to the semi cylinder guides 22. The semi cylinder guides 22 have enough strength on the top and bottom to hold the front part of the baler to the rearward part of the baler which consists of the bale chamber 4.

Under the bale chamber, toward the forward part of bale chamber 4, there is a plurality of wheels 5, with one on each side of the baler, designed to hold the baler an appropriate distance above the ground. The wheels 5 are to be of substantial size so as to allow the baler to be pulled forward by the powered wheeled vehicle and to create enough support to maintain the baler on the surface of the field. The plurality of wheels 5 are placed rearward of the center of gravity of the baler with foraged material in the bale chamber and a bale hanging off the end of the baler in such a way as to always maintain downward pressure on the hitch where the hitch is connected to the pulling vehicle.

The driveline 2 is connected to the gearbox 9 which reduces the speed of the output drives allowing the baler to function with the pulling vehicle operating at normal operating speeds. The gearbox 9 has two output shafts coming out of gearbox 9 at right angles to the driveline 2. One of the output shafts powers the packer fingers 26 and pickup 8 using basic chaining mechanisms to give them the appropriate power, speed, and direction. The other output shaft drives the flaker cart crank shaft 14 through a chaining mechanism 10. Two cams 48, concentrically and mechanically attached to the flaker cart crank shaft 14, move the flake separator fingers 50 in and out at the appropriate times. A crank 38, similarly attached to the crank shaft 14, moves the flaker cart fore-and-aft to place hay into the compression area when necessary.

In use, the flaker cart crank shaft 14 transfers power to the semi cylinder crank arm shaft 15 by means of a chain and sprockets on each of the shafts to create a ratio of 2 to 1 causing the flaker cart crank shaft 14 to rotate twice per rotation of the semi cylinder crank arm shaft 15. The flaker cart crank shaft 14 also transfers power to the tying drive shaft 16 by means of chain and sprockets on each of the shafts to create a 1 to 1 ratio causing both shafts to rotate at precisely the same speed. Similarly, the tying shaft transfers power to the knotter drive shaft through chain 13 and appropriate sprockets on both shafts to obtain precisely a one to one rotation ratio between them.

Connected to the sides of the baler toward the forward part are twine boxes 6 and 7. These boxes hold spools of twine which are fed out of the boxes through guides to the needles and then through the eye of each needle. After passing through the eye, the twine is then tied around each bale so as to hold the shape of the bale after leaving the bale chamber and settling to the ground.

The pickup 8 is designed to operate at a fast enough speed to lift the foraged material off of the ground as the wheeled vehicle pulls the baler forward. Once moved off the ground, the foraged material is placed by the pickup 8 in a location where the packer fingers 26 lift the foraged material up and towards the rear of the baler and force it into the continuous leaf forming chamber 30. The pickup 8, packer fingers 26, flaker cart crank shaft 14, and semi cylinder crank shaft 15 all operate at continuous speeds proportional to the input speed of the pulling vehicle.

Regarding synchronization, the pickup 8 and the packing fingers 26 are not synchronized to other moving mechanisms of the baler. The flaker cart crank shaft 14 and the flake separator mechanism operate continuously and are synchronized, both with each other and the movement of the semi cylinder crank arm shaft 15, by proper placement of the chain 12. The needle knotter drive shaft 16 makes one revolution when a bale is to the desired length and is synchronized to the movement of the semi cylinder 24 by proper placement of the chains 11, 13 on the appropriate sprockets. During tying, the tying mechanism makes one revolution at the same time that the semi cylinder crank 15 makes a half revolution moving the semi cylinder 24 through the top half of its motion.

Figure 3:
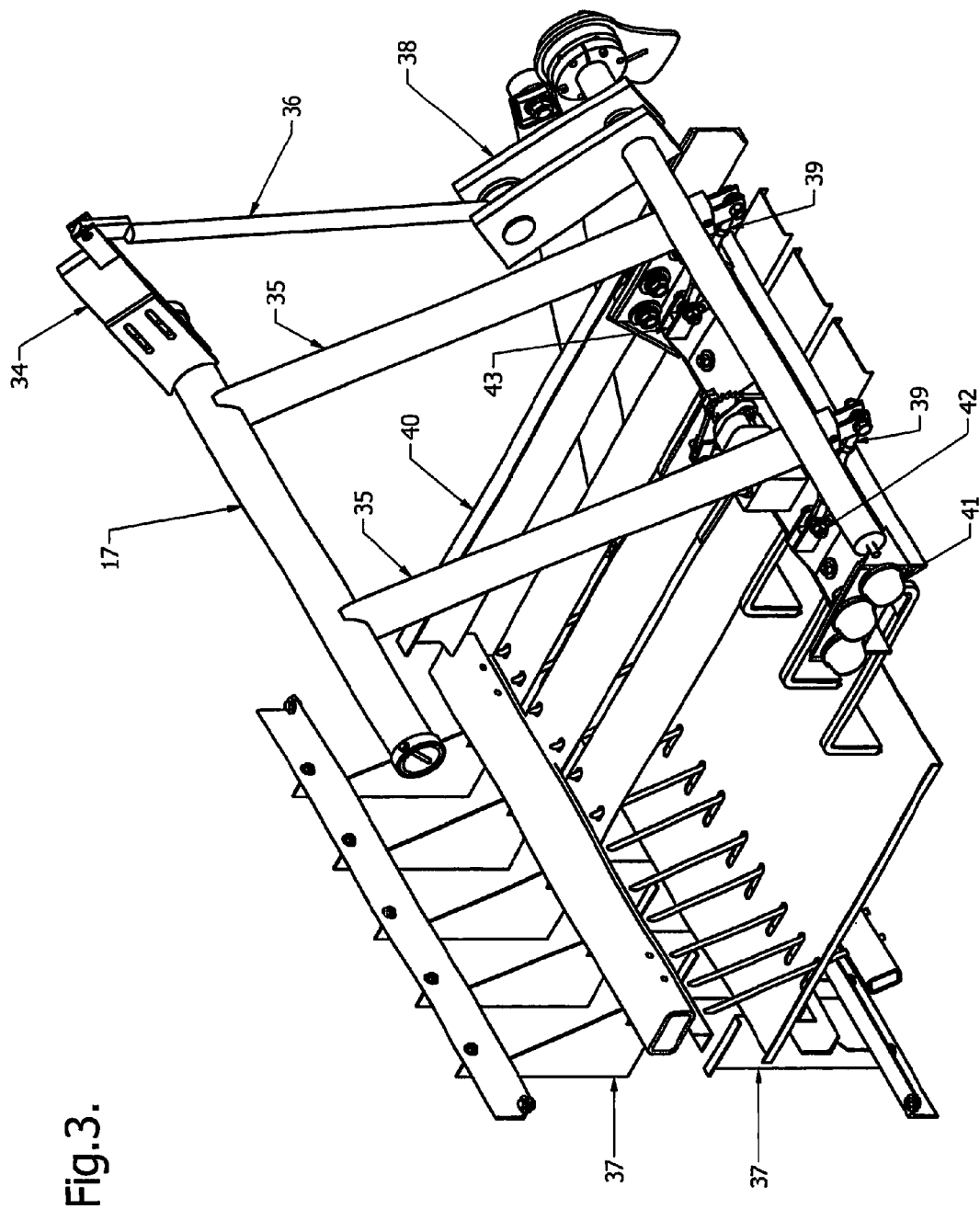
FIG. 3 is an isometric view showing the flaker cart and the separator fingers.

An isometric view of the flaker cart 23 and the separator fingers 50 is shown is FIG. 3. As shown in this figure, the flaker cart 23 is held in position by the guides 40 and rollers 41 that are attached to the flaker cart 23. The guides 40 allow the cart 23 to move back and forth, pushed by arms 35. The arms 35 are themselves moved fore-and-aft by the rotation of a crank 38 on shaft 14. A connecting rod 36 from the crank 38 to the driving arm 34 connected to shaft 17 moves arms 35 in a fore-and-aft motion with one rotation of the crank 38. At the distal end of arms 35 are linkages 39 which are pivotally connect to the arms 35 and the flaker cart 23 at points 42, 43. This arrangement allows the flaker cart 23 to move fore-and-aft at the proper times when moving a half a leaf into the compression area. When necessary, the timing of this movement can be adjusted by rotating the chain on the drive sprockets. Shaft 14 turns twice as fast as the semi cylinder drive shaft 15 and, therefore, places a half a leaf into the compression area above and below the semi cylinder as the semi cylinder moves up and down.

Figure 4:
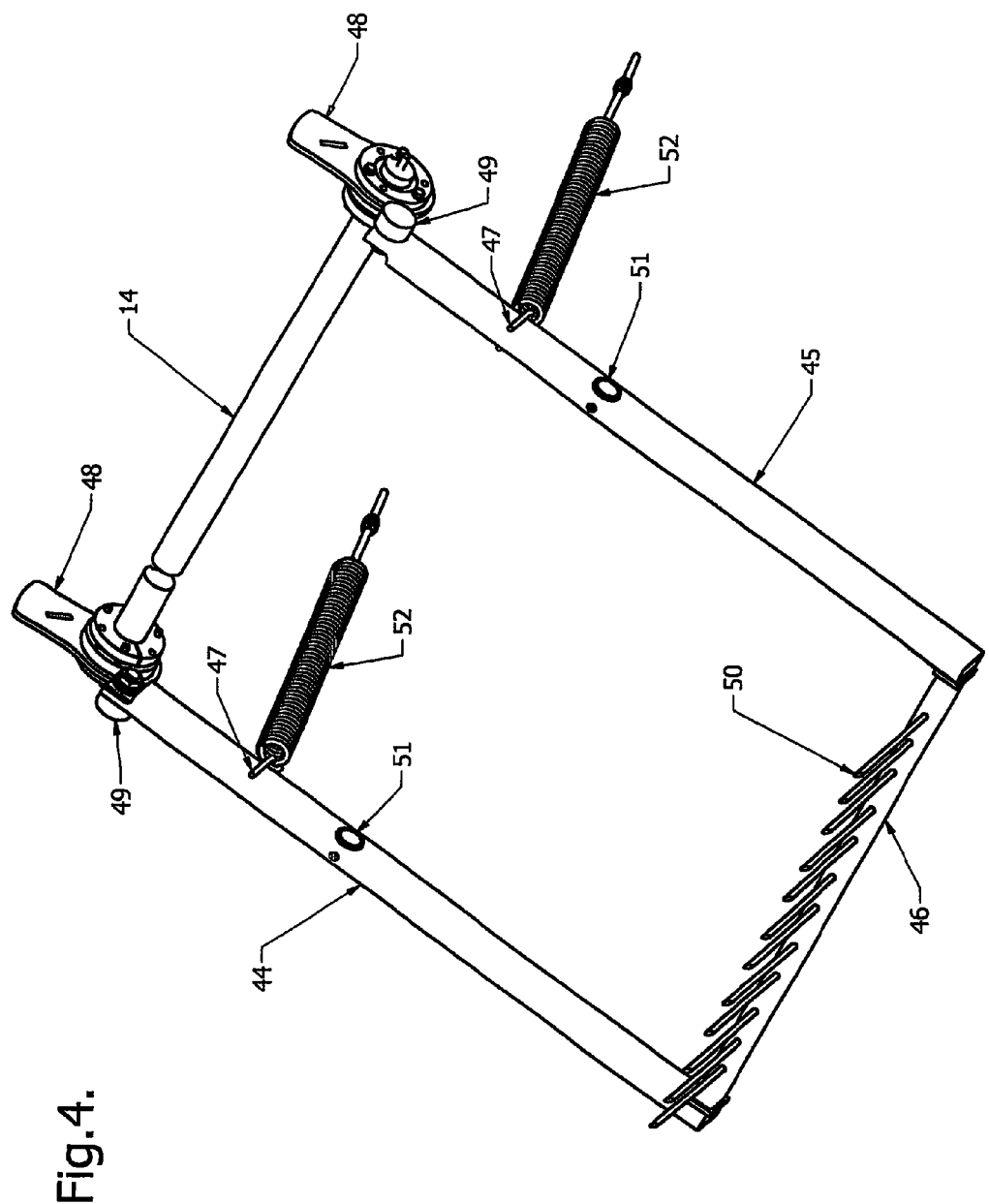
FIG. 4 is an isometric view showing the cam that drives the separator fingers.

FIG. 4 provides an isometric view of the cam 48 that drives the separator fingers 50. In use, the flake separator pivots on journals 51. Its movement is controlled by the cams 48 rotating on shaft 14 pushing on the cam followers 49. The flake separator's retraction is controlled by the flake separator springs 52 attached between structural members 3 and the flake separator spring attachments 47. The flake separators right and left arms 45, 44 respectively are attached to the separator fingers 50 and hold member into which, through holes, the flake separator fingers 50 are welded.

Figure 5:
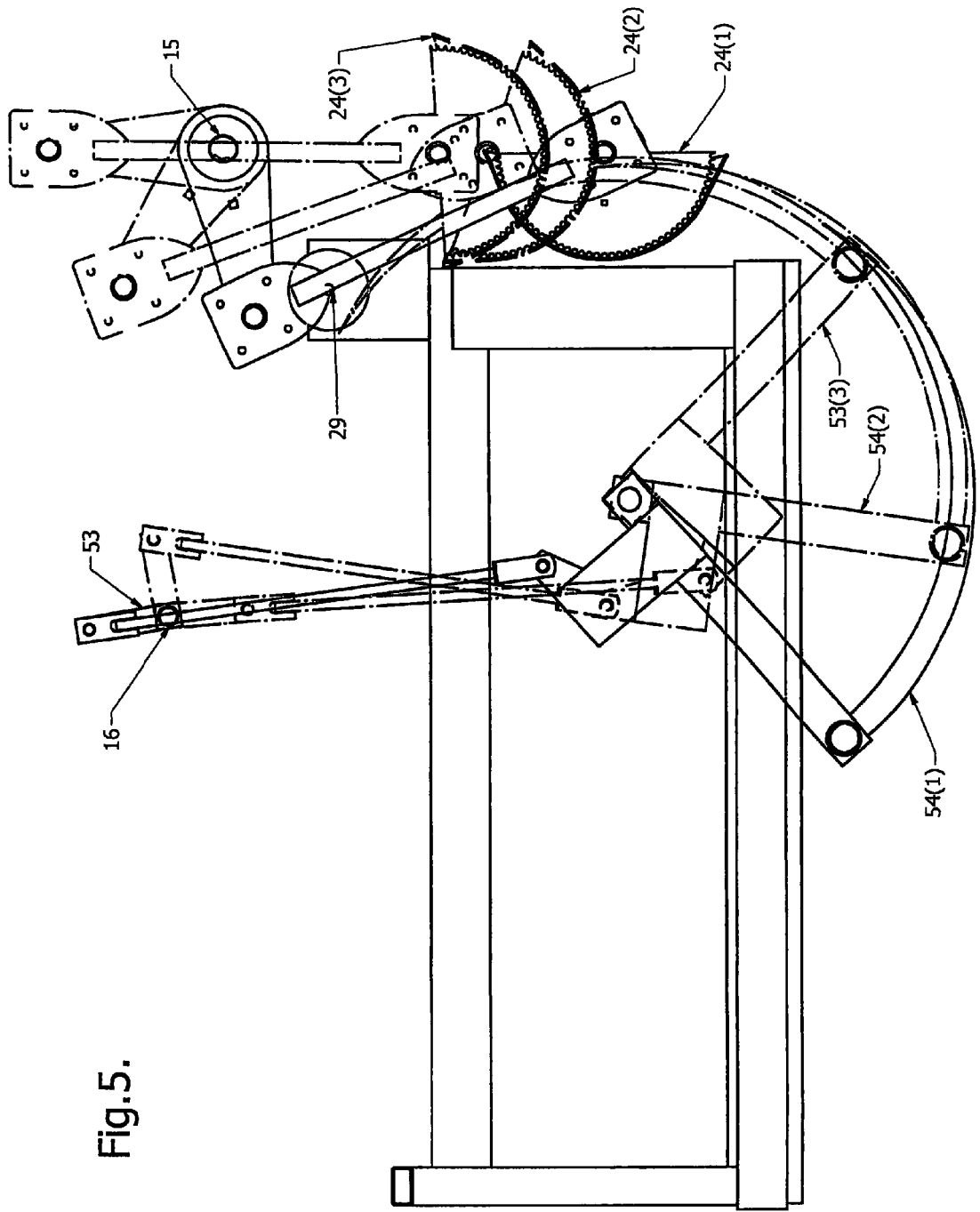
FIG. 5 is a side view showing the movement of the semi cylinder and the needles in sync with the semi cylinder.

FIG. 5 shows the timing of the knotter and needle mechanism by providing a side view showing the movement of the semi cylinder 24 and the needles 54 in sync therewith. In use, the knotter needle drive shaft 16, connected to the needle crank arms 53, is rotated twice for every rotation of the semi cylinder drive shaft 15. The knotter needle clutching mechanism is allowed to be released by the computer when the compression roller is moving down and is past the half way position on the semi cylinder guide. The clutching mechanism engages the knotter needle drive shaft 16 at the point in time when the semi cylinder is moving up and is in position 24(1). The needles 54 pass through the grooves in the semi cylinder 24 and deliver the twine to the knotters as the semi cylinder 24 rotates through the first quarter of its revolution. Next, the needles 54 retract to the home position as the semi cylinder 24 rotates through the next quarter of a revolution. This allows the knotter needle drive shaft 16 to make one complete revolution to rotate the knotter drive shaft 29 through one revolution, which, in turn, allows the knotter assembly to make a completed knot. The relationship of the rotation between the semi cylinder crank shaft 15 and the Needle knotter drive shaft 16 is determined by the difference in size of the sprockets that are turning each of them in proportion to the flaker cart crank shaft 15. The ratio should be precisely two to one in order for the mechanism to stay in synchronization, as can be seen from the 180 degree rotation of the needle crank arm 53 relative to the ninety-degree rotation of the semi cylinder drive shaft 15.

Figure 6:
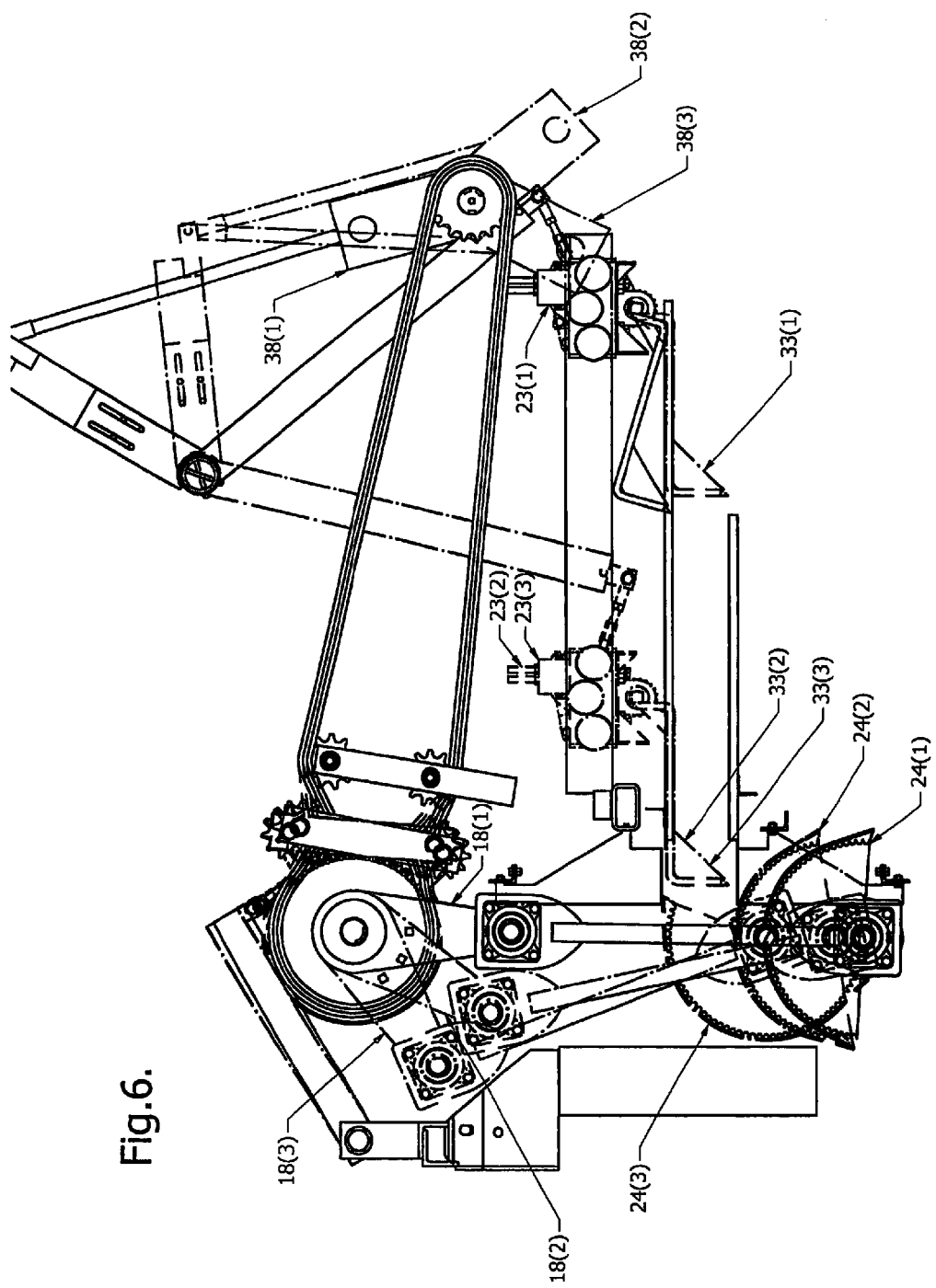
FIG. 6 is a side view showing the movement of the semi cylinder, timing adjustor and the flaker finger cart in sync with the semi cylinder on the up stroke.

FIG. 6 is a side view showing the movement of the semi cylinder 24 and timing adjustor and flaker finger cart 23 in sync with the semi cylinder 24 on the up stroke. As shown, the synchronization of the flaker cart 23 and the semi cylinder 24 is created by the cranking mechanisms on the semi cylinder crank shaft 15 and the flaker crank shaft 14. The flaker crank position 38(1) positions the flaker cart in the 23(1) position. In this position, the flaker fingers 33 can be engaged by the computer at the appropriate time as the flaker cart is moved towards the semi cylinder 24. The semi cylinder is in position 24(1) to allow the hay to be placed above it by the flaker fingers 33 attached to the flaker cart. As the flaker cart moves to position 23(2) the flaker crank moves to position 38(2) which is about 15 degrees before bottom dead center.

At this point the semi cylinder 24 as moved to position 24(2) and is ready to engage the half a leaf delivered just above it. The flaker fingers 33 move toward the semi cylinder to a point where they come almost in contact with it and then move back to position 23(3) as the semi cylinder 24 moves to 24(3). This happens as the flaker cart crank moves approximately 30 degrees from position 38(2) to 38(3) and the semi cylinder crank moves from position 18(2) to 18(3) about 15 degrees. The flaker fingers 33 are lined up with the grooves in the semi cylinder 24 and pass through those grooves as the semi cylinder 24 moves from position 2 to position 3 to allow the flaker fingers 33 to come close to the center of the semi cylinder 24.

Figure 7:
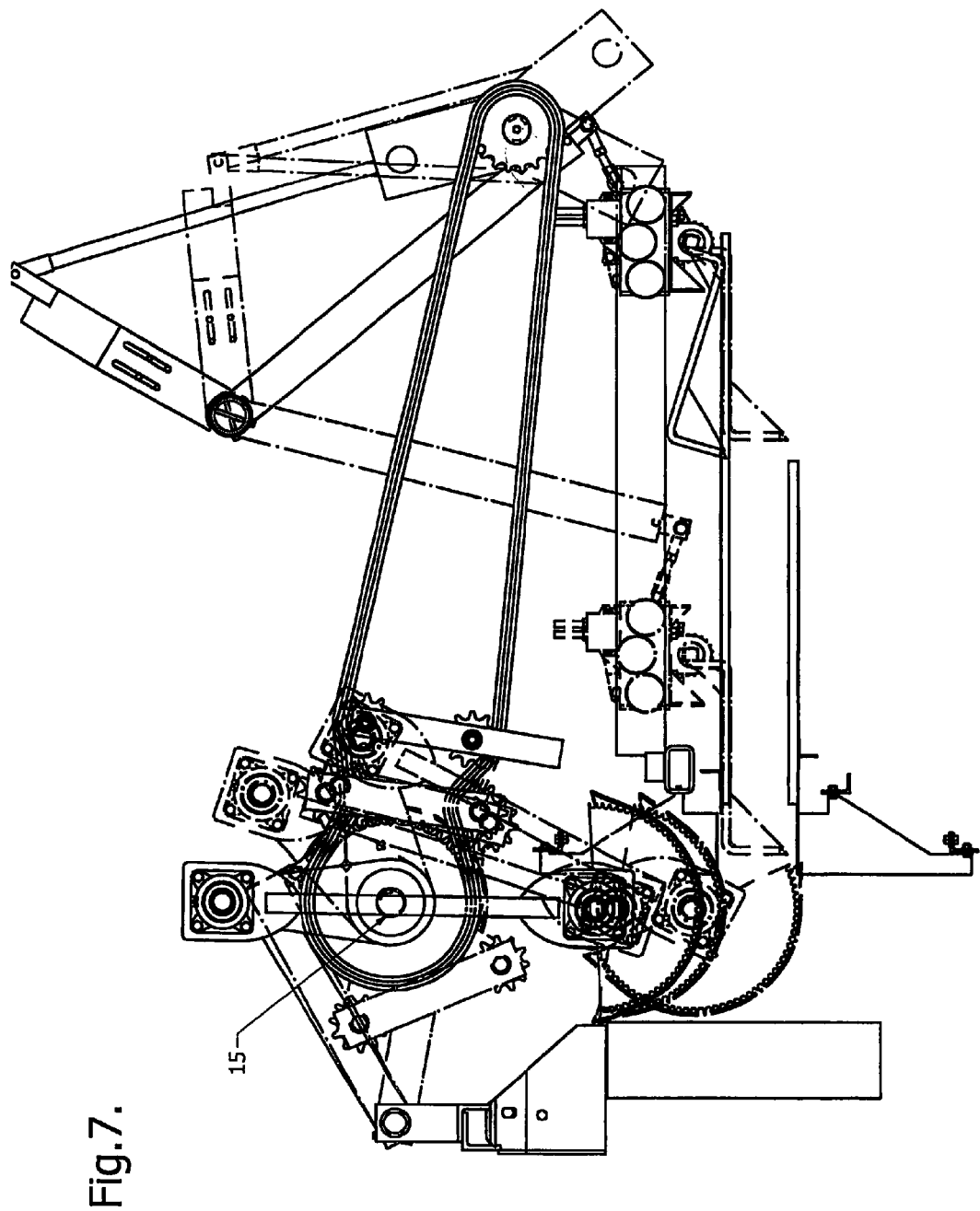
FIG. 7 is a side view showing the movement of the semi cylinder, timing adjustor and the flaker finger cart in sync with the semi cylinder on the down stroke.

FIG. 7 is a side view showing the movement of the semi cylinder 24 and the timing adjustor and the flaker finger cart in sync with the semi cylinder 24 on the down stroke. In order for this to happen on the down stroke of the semi cylinder 24 as shown in FIG. 7, a timing correction device is likey needed. This timing device, as shown in FIG. 9, rotates the semi cylinder crank shaft 15 approximately 15 degrees forward in order to make up for the triangulation delay of the semi cylinder crank.

Figure 8:
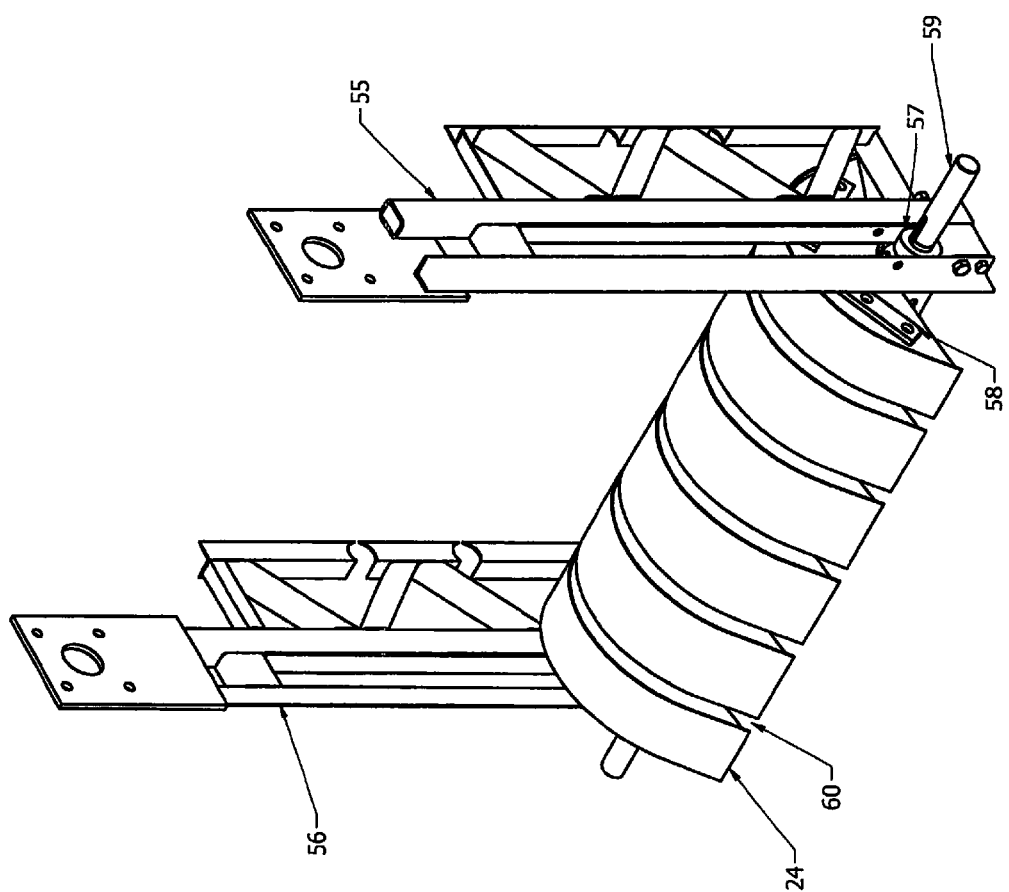
FIG. 8 is an isometric view showing the bearing and guides of the semi cylinder.

FIG. 8 is an isometric view showing the bearing and guides 55 and 56 of the semi cylinder. The semi cylinder 24 is almost as wide as the bale chamber 4. It is held in place by two rollers 57 that are placed on shaft 59, one on each side of the semi cylinder 24. The rollers hold the semi cylinder 24 in place fore and aft by the semi cylinder guides 55 and 56. These guides 55, 56 are solidly attached to the bale chamber 4 as shown in FIG. 1. The guides 55, 56 allow the semi cylinder 24 to be moved up and down the height of the bale being made in the bale chamber 4. The semi cylinder 24 is further constrained from moving sideways by wear plates 58. These wear plates 58 are attached to the semi cylinder 24 and rub against the inside of the bale chamber 4 thereby limiting the sideways movement of the semi cylinder 24.

The grooves 60 in the semi cylinder 24 are wide and deep enough to allow the needles 54 to pass through them as the semi cylinder 24 goes through the top half of its rotation. The grooves 60 are spaced to align with the needles 54, which are themselves aligned with the knotters to place the twine in the appropriate spot so the knotter can make a knot to tie off the bale in the bale chamber 4.

Figure 9:
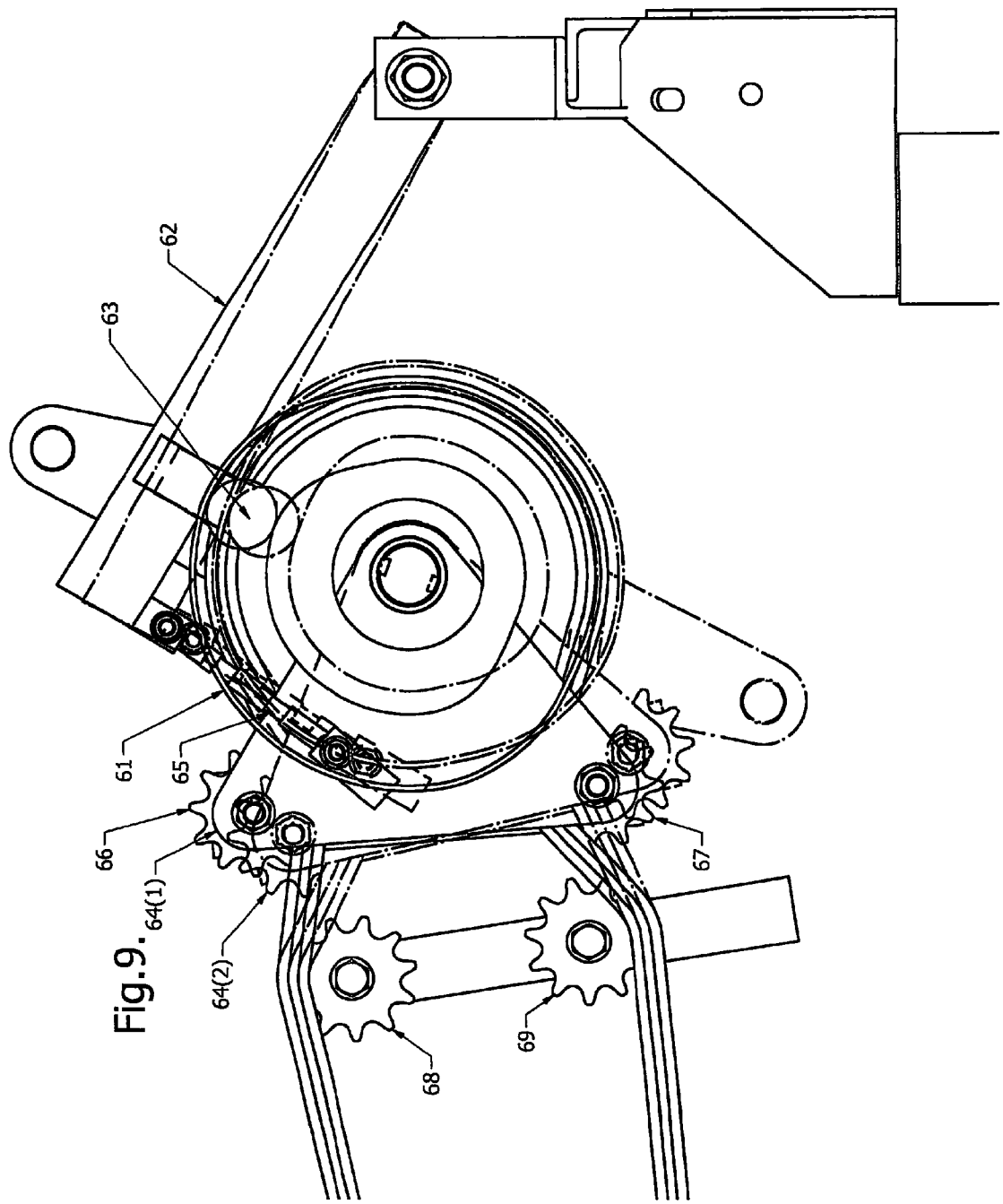
FIG. 9 is a side view showing the timing adjustor mechanism and timing cam.

FIG. 9 is a side view showing the timing adjustor mechanism and timing cam 61. The timing for the semi cylinder 24 to the flaker fingers 33 is corrected by the device as shown in this figure. This device makes the route of the chain shorter between the drive sprockets on the bottom as it makes the route of chain longer between the drive sprockets on the top, and vice versa, as the semi cylinder crank shaft 15 rotates the time cam 61 solidly attached to it. The change of the lengths of the routes is accomplished by placing two stationary sprockets 68 and 69 close to the drive sprocket but not so close that rotating idler sprockets 66 and 67 cannot fit between them and the drive sprocket. Rotating idler sprockets 66 and 67 are connected to 64 which is able to pivot around shaft 15. The timing cam 61 pushes and pulls the cam follower 63 up and down as shaft 15 rotates. The cam follower 63 moves the cam arm 62 back and forth. The linkage 65 pivotally connects to the end of the cam arm 62 and the rotating sprocket holder 64 and causes sprockets 66 and 67 to rotate clock wise and counterclockwise as shaft 15 rotates and pushes and pulls the cam follower 63. When rotating sprocket holder 64 is in position 1, the bottom chain route is shorter and the top chain is forced to go through a longer route and thereby the drive sprocket is rotated counterclockwise enough to make up for the timing correction needed to for the semi cylinder 24 to engage the hay delivered to it by the flaker fingers 33 at the right time. The opposite occurs when the rotating sprocket holder is in position 2.

Figure 10:
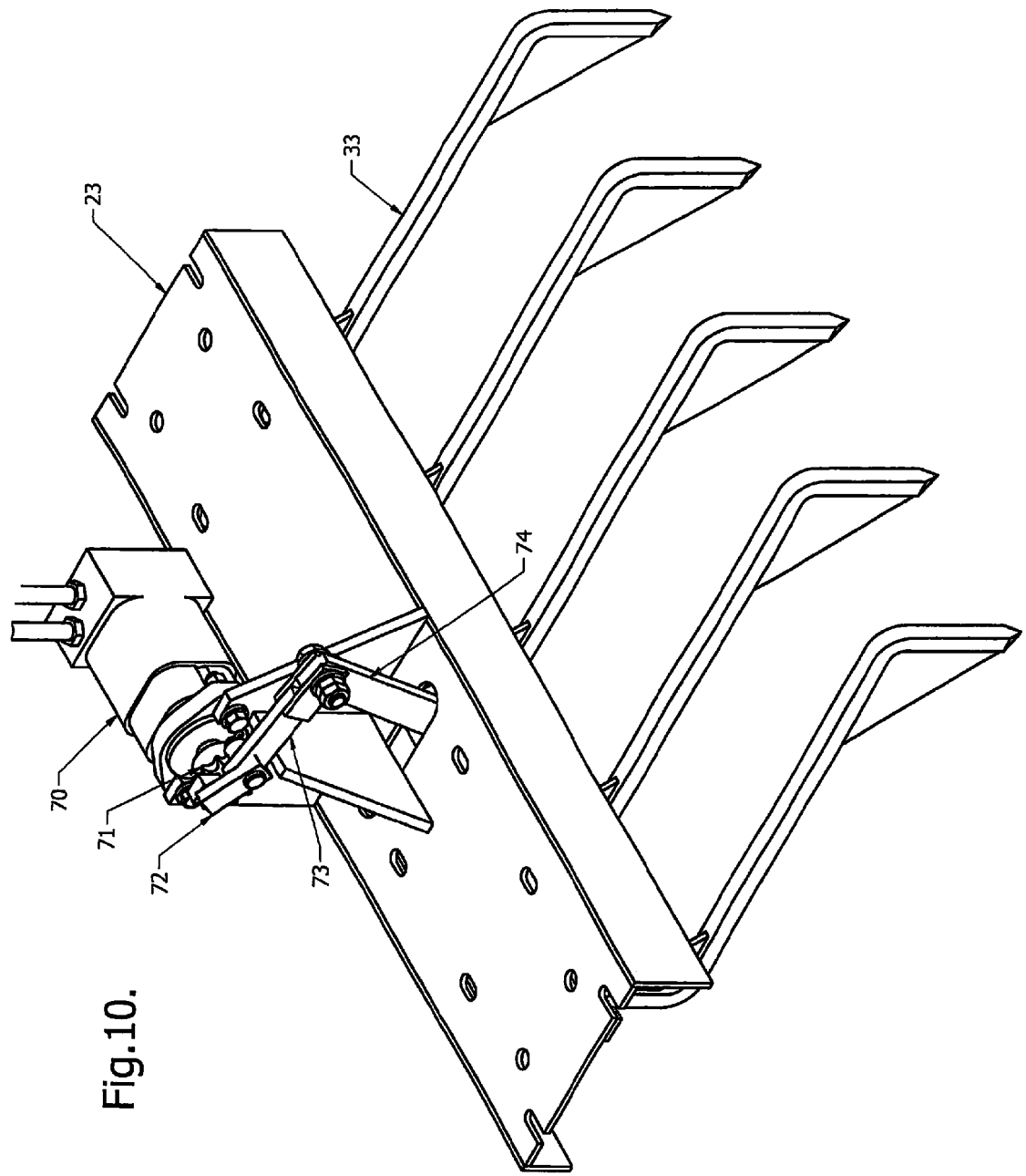
FIG. 10 is an isometric view of the flaker cart actuation mechanism.
Figure 11:
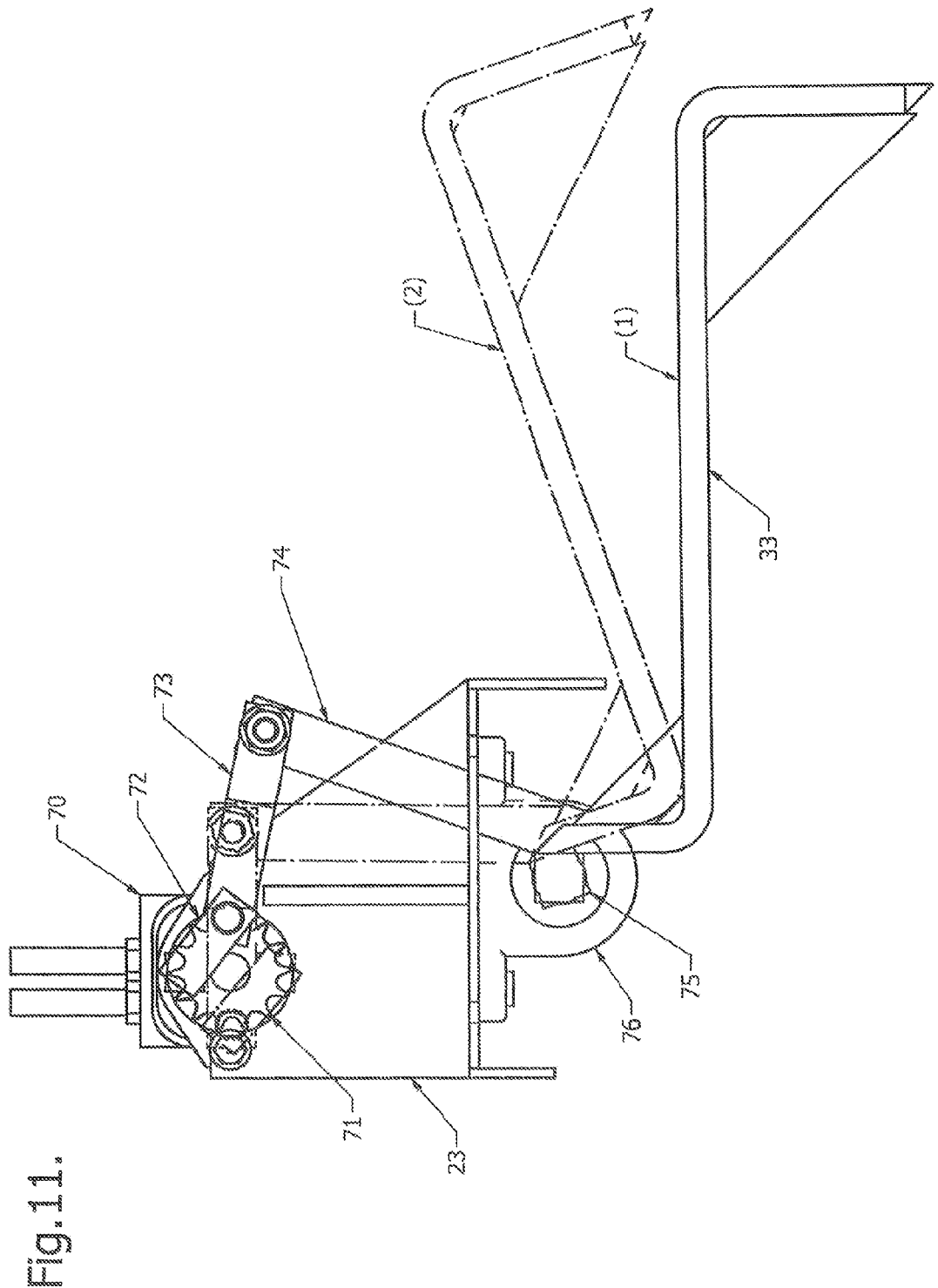
FIG. 11 is a side view showing the actuation of the flaker cart fingers.

FIG. 10 is an isometric view of the flaker cart actuation mechanism. FIGS. 10 and 11 show the motion of the flaker cart 23 and the flaker fingers 33. The flaker fingers 33 are solidly connected to the flaker finger shaft 75 at positions to allow the flaker fingers 33 to align with the grooves 60 in the semi cylinder 24. The flaker finger shaft 75 is pivotally connected to the flaker cart 23 through bearings 76 spaced at a distance apart to support the flaker finger shaft 75. They are rotated by lever 74 which is solidly connected to the flaker finger shaft 75. This lever extends upward through the flaker cart 23 at a distance to where the hydraulic motor can rotate it through the two positions shown on FIG. 11. On the distal end of lever 74 is linkage 73, pivotally connected to lever 74. The opposite end of linkage 73 is pivotally connected to flaker finger crank pivot 72 which is rotated about the orbit motor shaft approximately 180 degrees to move the flaker fingers 33 from position 1 to position 2 as shown in FIG. 11.

As shown in FIG. 11, the flaker fingers 33 are attached to the flaker cart by shaft 75 and are pivotally mounted to the cart through bearings 76. The flaker fingers 33 are rotated about the bearings by lever 74 and a pivotal connecting link 73 which pivotally attaches to the flaker finger crank pivot 72, which is itself rotated by orbit motor 70.

Figure 12:
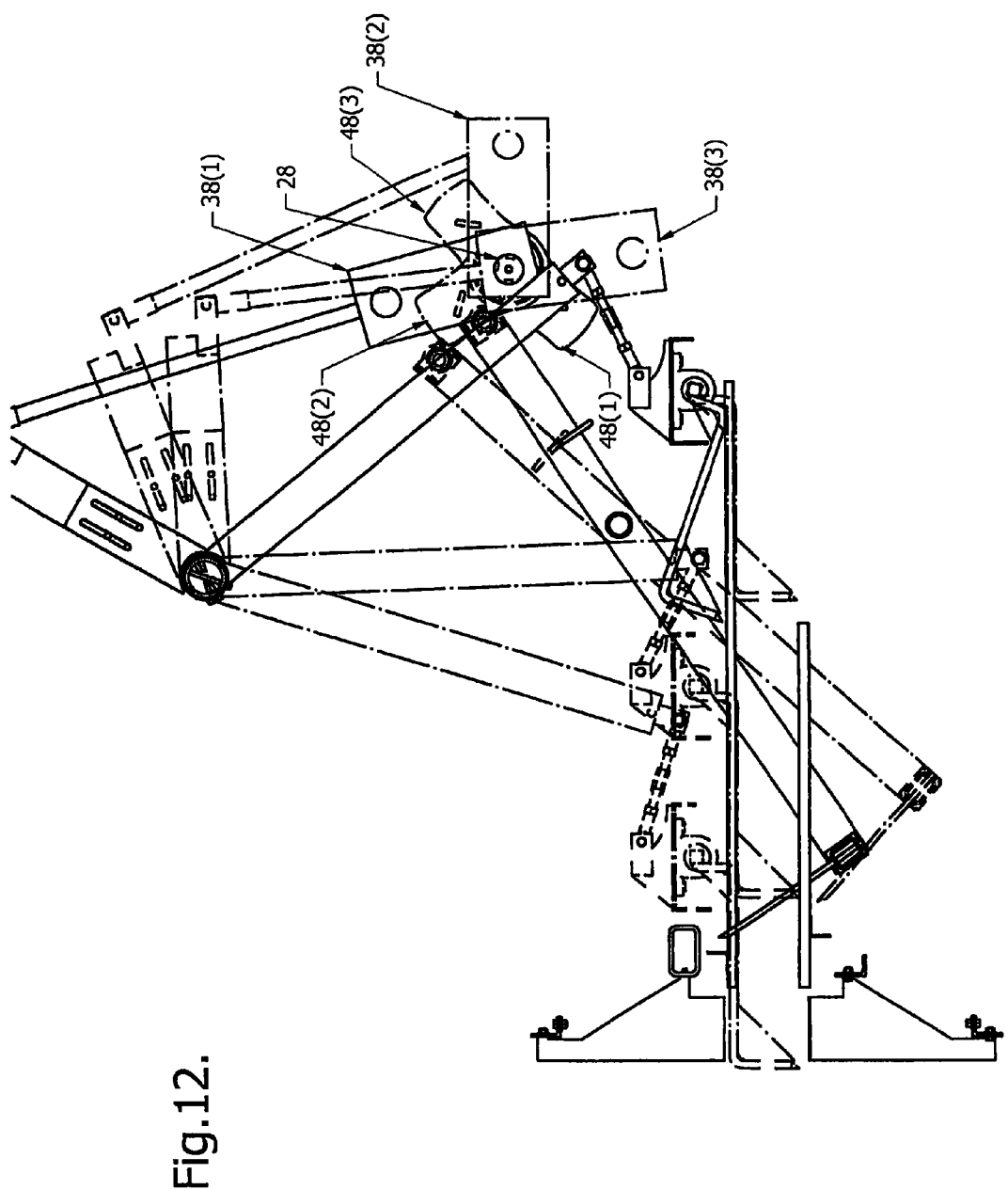
FIG. 12 is a side view showing the synchronization of the flaker cart fingers to the separator fingers 50.

FIG. 12 is a side view showing the actuation of the flaker cart fingers. This view shows the synchronization of the flaker fingers 33 to the separator fingers 50. This is accomplished by the fixed angular location of the flaker cart crank 38 to the separator fingers 50 cam 48 on the flaker cart drive shaft 28. When the flaker cart crank 38 is in position 38(1) the separator finger cam 48 is in 48(1) to keep the hay from being pushed into the compression area. As the crank rotates to position 38(2) the separator cam moves to position 48(2) to hold the separator fingers 50 out of the continuous leaf forming chamber. As the crank moves to position 38(3) the flake separator cam moves to position 48(3) which allows the spring to pull the separator fingers 50 back into the continuous leaf forming chamber as the flaker fingers 33 pass by. The cam allows the separator fingers 50 to stay in the continuous leaf forming chamber while the flaker cart returns to engage another half leaf.

Figure 13:
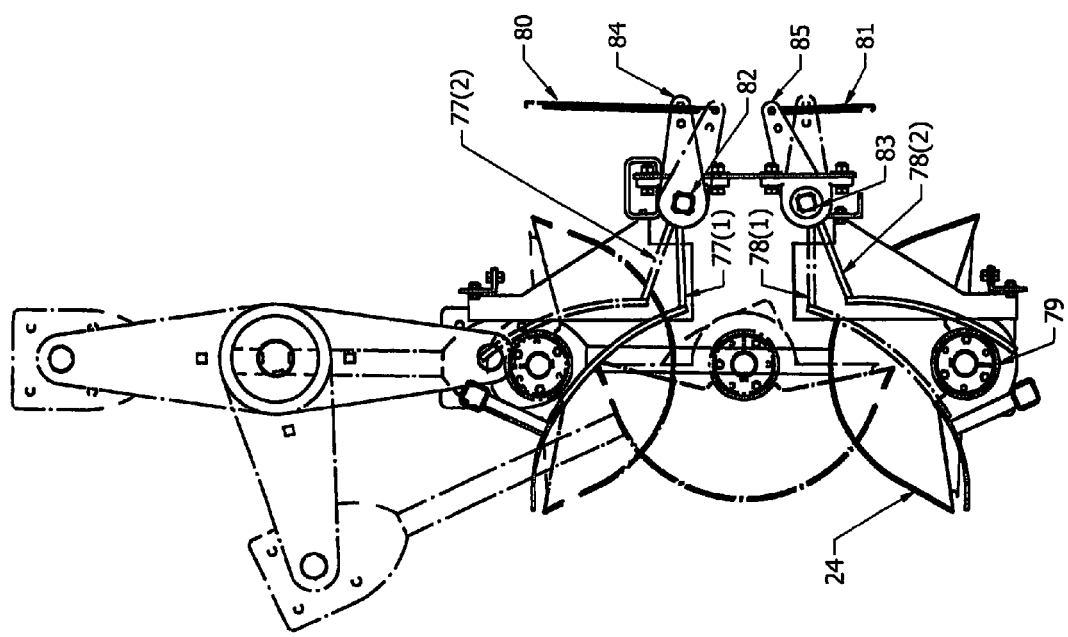
FIG. 13 is a side view showing the movement of the semi cylinder with the rake fingers.

FIG. 13 is a side view showing the movement of the semi cylinder 24 with the rake fingers 77, 78. As this semi cylinder crank moves the semi cylinder 24 from position (1) to position (2) the center of the semi cylinder 24 comes in contact with the upper rake fingers 77 when they are in position (1) and moves them to position (2) as the semi cylinder moves upward. The upper rake fingers 77 are released when the semi cylinder 24 moves downward and then are moved back down to position (1) propelled by the force of the extension spring 80. The upper rake fingers 77 are solidly connected to the square shaft 82. The lever arm 84 is also solidly connected to the square shaft 82 and therefore the force of spring 80 will return the rake fingers back to their home position 77(1) as the semi cylinder moves from 24(1) to 24(2).

The motion is similar on the bottom rake fingers 78. The bottom rake fingers 78 are solidly connected to the square shaft 83. The lever 85 is also solidly connected to shaft 83. In use, the extension spring 81 holds the bottom rake fingers 78 in the home position of 78(1) until the semi cylinder center 79 comes in to contact with the bottom rake fingers and moves them downward to position 78(2). As the semi cylinder 24 moves upward the extension spring moves the bottom rake fingers 78 back to home position.

Figure 14:
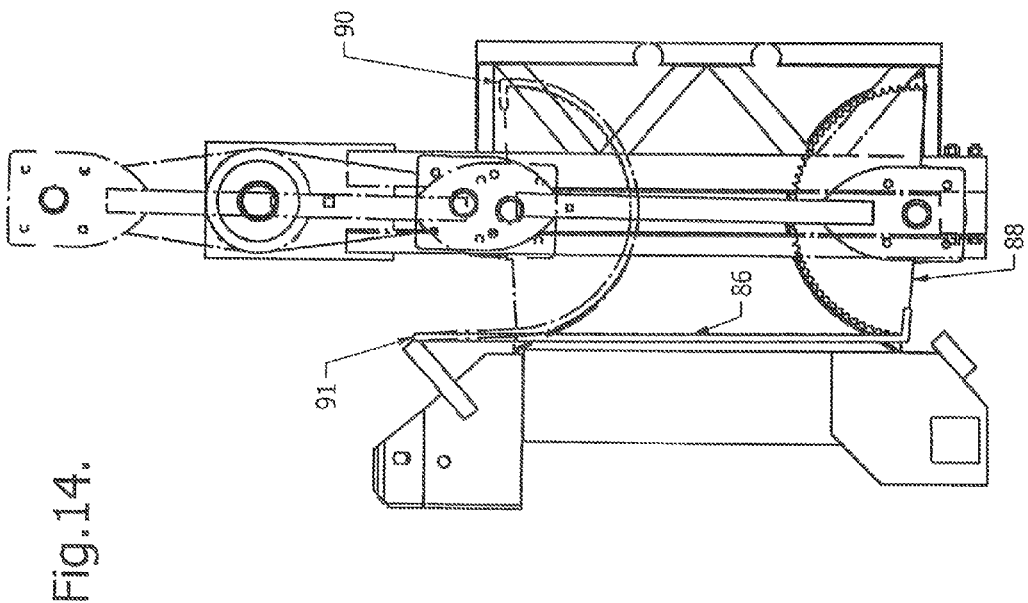
FIG. 14 is a side view showing the semi cylinder with half sprocket and chain for the right side of the baler.

FIG. 14 shows the semi cylinder 24 with half sprocket and chain from the right side. As the semi cylinder 24 is raised, it is forced to rotate counter clockwise by chain 86 connected to the half sprocket 88 at point 90. The chain 86 is than wrapped around the sprocket and connected to the top part of the bale chamber at 91. The half sprocket 88 is approximately the same diameter as the semi cylinder 24 and therefore when the semi cylinder 24 and half sprocket 88 move downward due to the motion of the semi cylinder crank, the semi cylinder 24 and the half sprocket 88 are forced to rotate clockwise. If half of the circumference of the semi cylinder 24 is equal to the height of the bale, the semi cylinder 24 will have rotated 180 degrees as it moves to the bottom of the semi cylinder guide.

Figure 15:
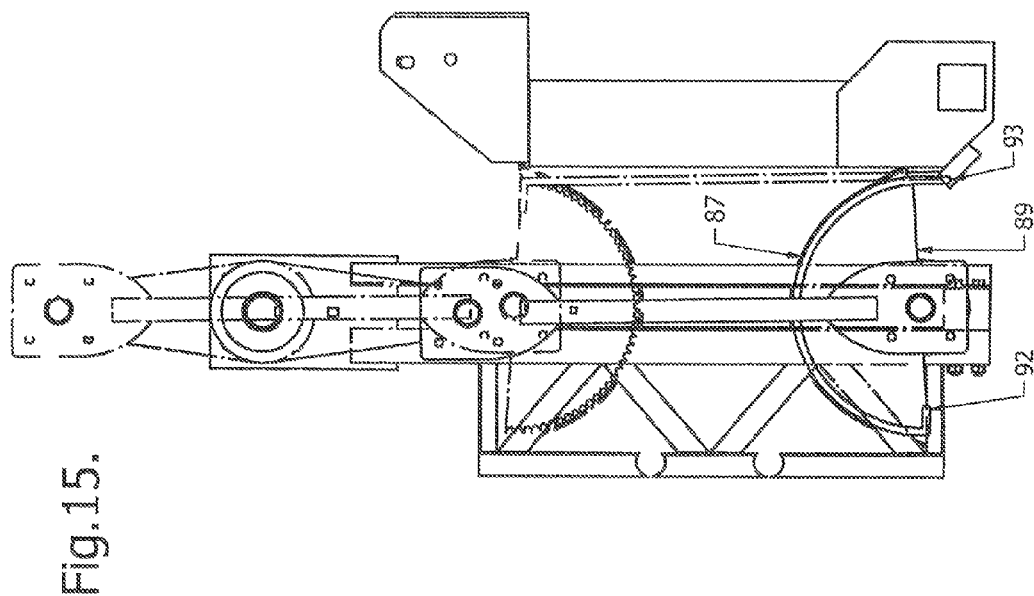
FIG. 15 is side view showing the semi cylinder with half sprocket and chain for the left side of the baler.

FIG. 15 shows the semi cylinder 24 with half sprocket 89 and chain 87 for the left side. In use, the right side will work similarly to the left side. Chain 87 is connected to the half sprocket 89 at point 92. The chain is then wrapped around the half sprocket and connected to the bottom of the bale chamber at 93. When the semi cylinder crank moves the semi cylinder and half sprocket up the semi cylinder 24 and half sprocket 89 are forced to rotate 180 degrees clockwise. While this is occurring, the left side chain is being wrapped up. The left side chain is being unwrapped around the sprocket as the right side chain is being wrapped around the sprocket and vice versa.

Figure 16:
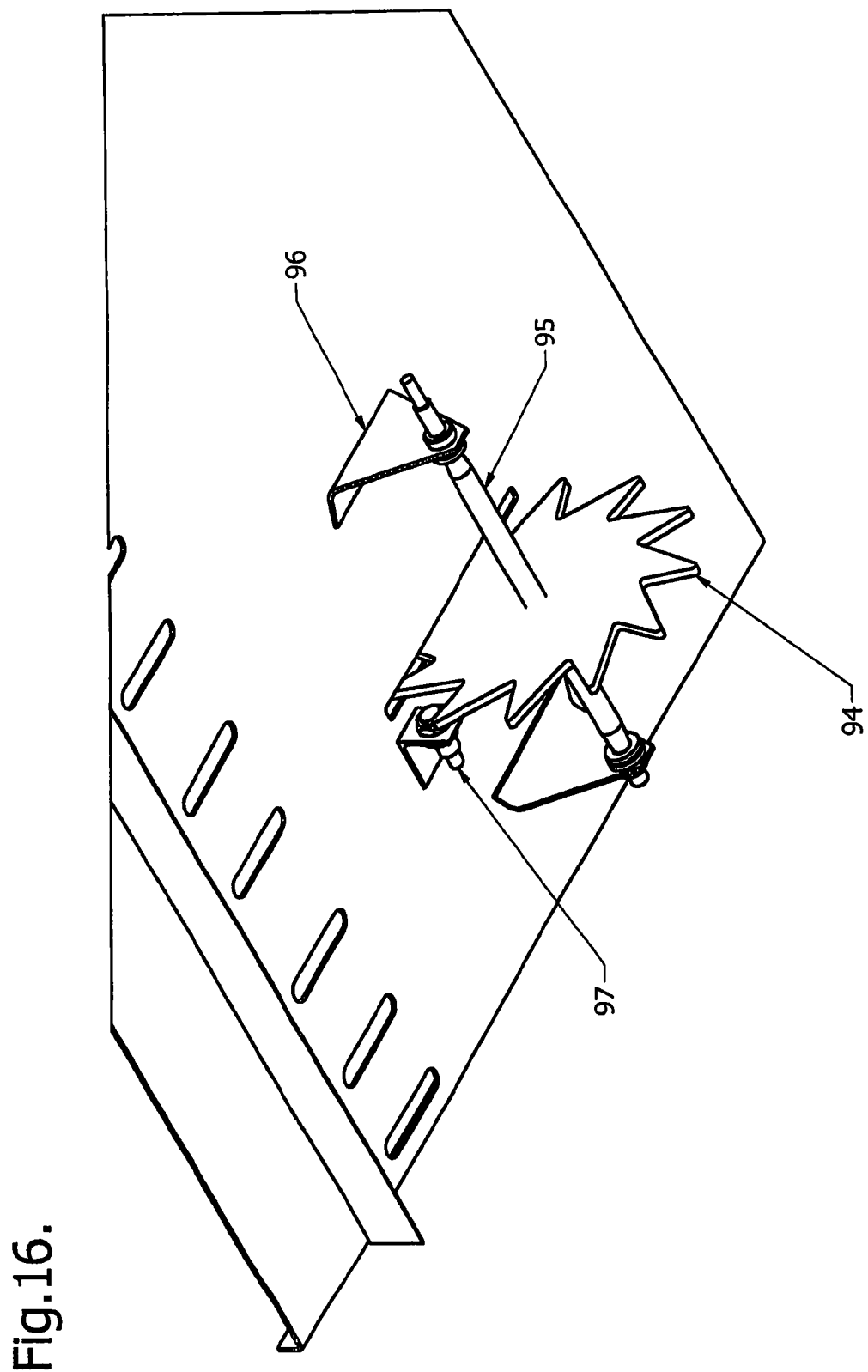
FIG. 16 is an isometric view showing the continuous leaf forming chamber, star wheel, and sensor.

FIG. 16 shows the continuous leaf forming chamber star wheel 94 and sensor. The star wheel 94 is shaped to engage hay as the hay is being pushed to the semi cylinder 24 by the flaker fingers 33 and the packer fingers. The star wheel 94 is placed far enough into the continuous leaf forming chamber so as the hay passes by the star wheel 94, the star wheel 94 turns proportionally to the amount of hay that is passing through the continuous leaf forming chamber. The star wheel 94 is held in position by the shaft 95 and the brackets 96 which allow its rotation. The amount of hay being pushed into the continuous leaf forming chamber is monitored by the sensor 97 which feeds a signal to the computer with the passing of each point of the star. The computer can then determine when to engage the flaker fingers 33 as the flaker cart moves forward.

Figure 17:
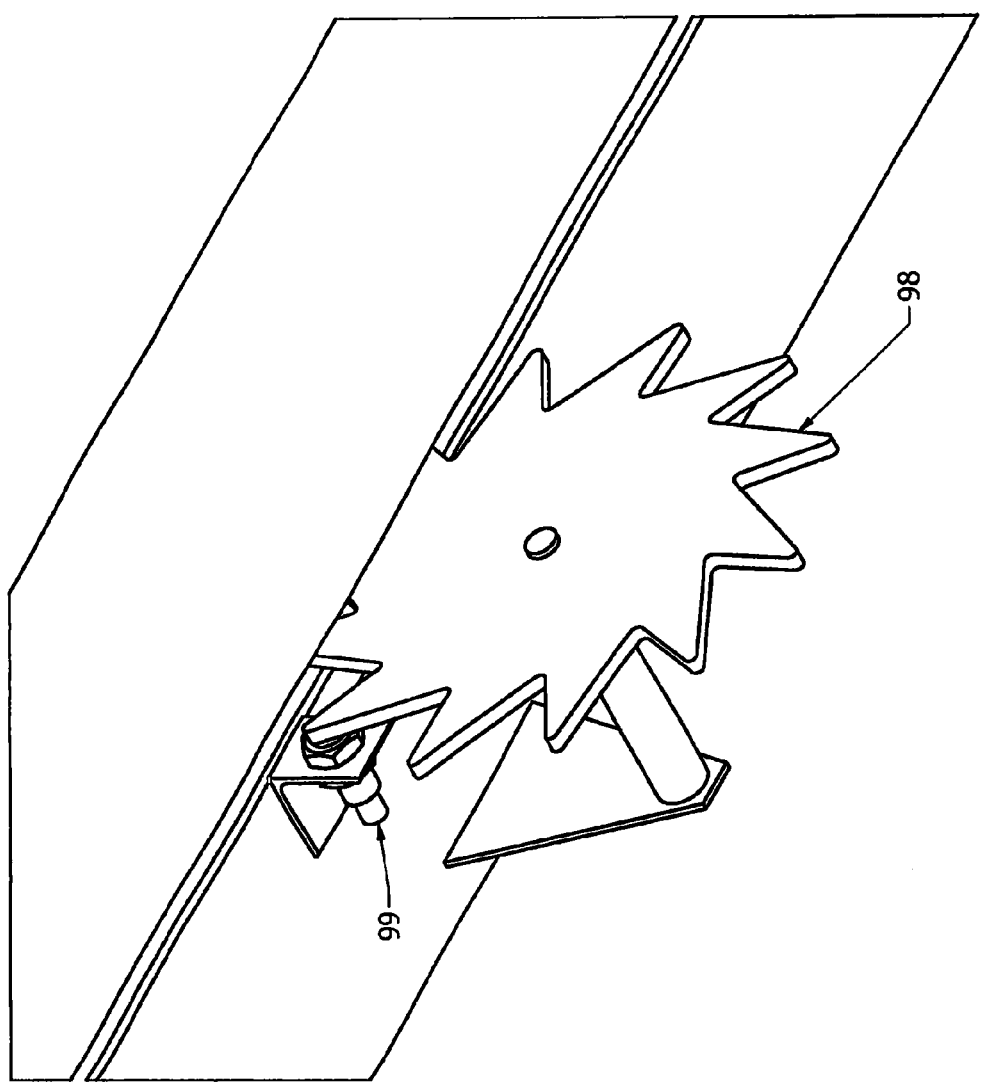
FIG. 17 is an isometric view showing the bale chamber, star wheel, and sensor.

FIG. 17 shows the bale chamber star wheel 98 and sensor 99. The bale chamber star wheel 98 works and is arranged similar to the continuous leaf forming star wheel and is located on the bottom of the bale chamber 4 and rotates in proportion to the length of bale that is being pushed through the bale chamber 4. The sensor 99 sends a signal to the computer every time a point of the star 98 passes by the sensor 99.

Figure 18:
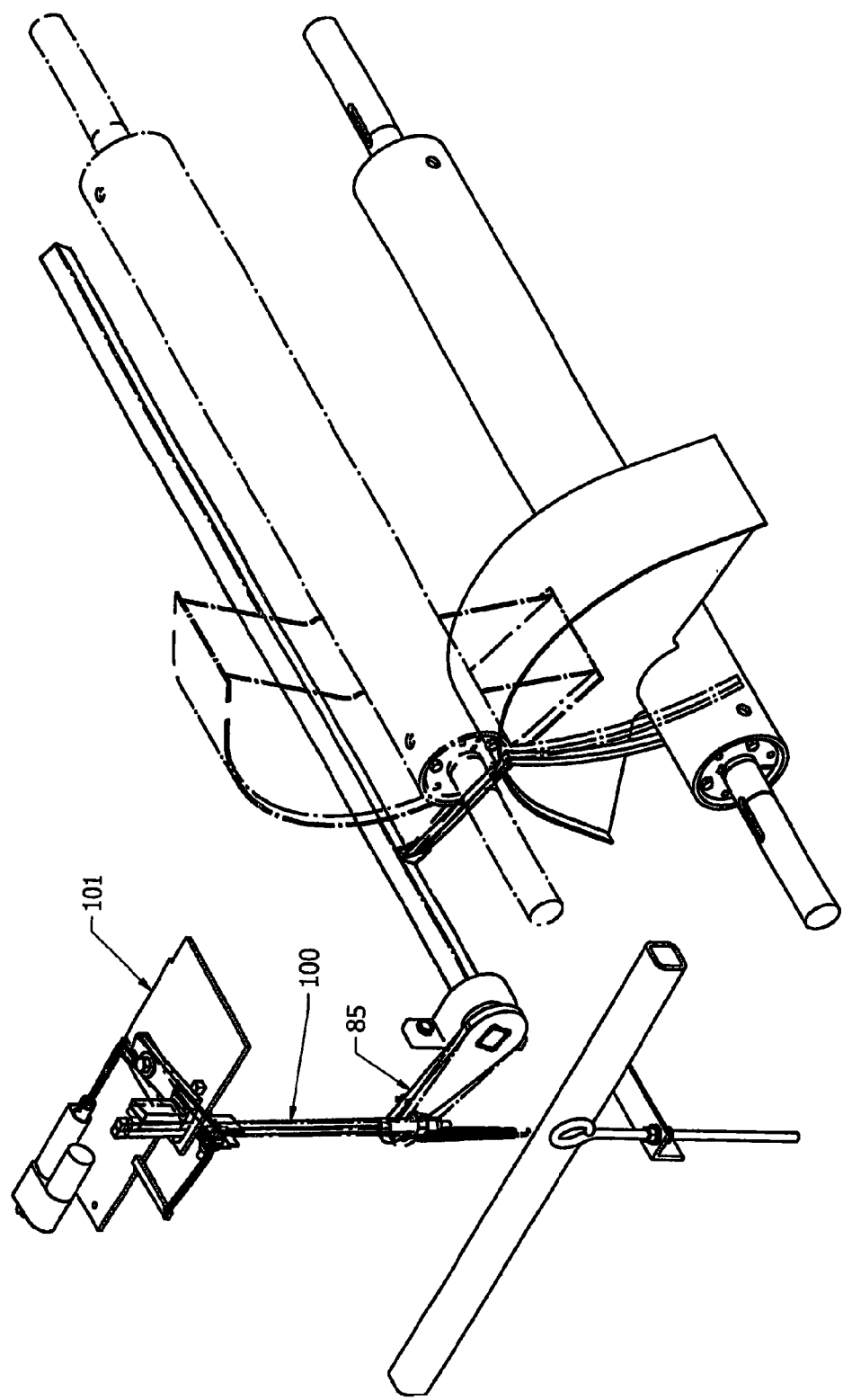
FIG. 18 is an isometric view showing the rake finger lock out device.

FIG. 18 shows the rake finger lock out device in an isometric view. During the tying cycle the bottom rake fingers 78 need to be held back to allow the needles 54 to place the twine into the knotters. The rake fingers 78 are held back by the device shown in FIG. 18. A hooked rod 100 is pivotally connected to lever 85 so that as the semi cylinder 24 pushes the rake fingers 78 back, the rod is pushed up through plate 101. On the end of the rod 100 that has been pushed through the plate 101 is a hook that can be engaged to hold the rod 100 up, which in turn holds the rake fingers 78 back during the tying cycle.

Figure 19:
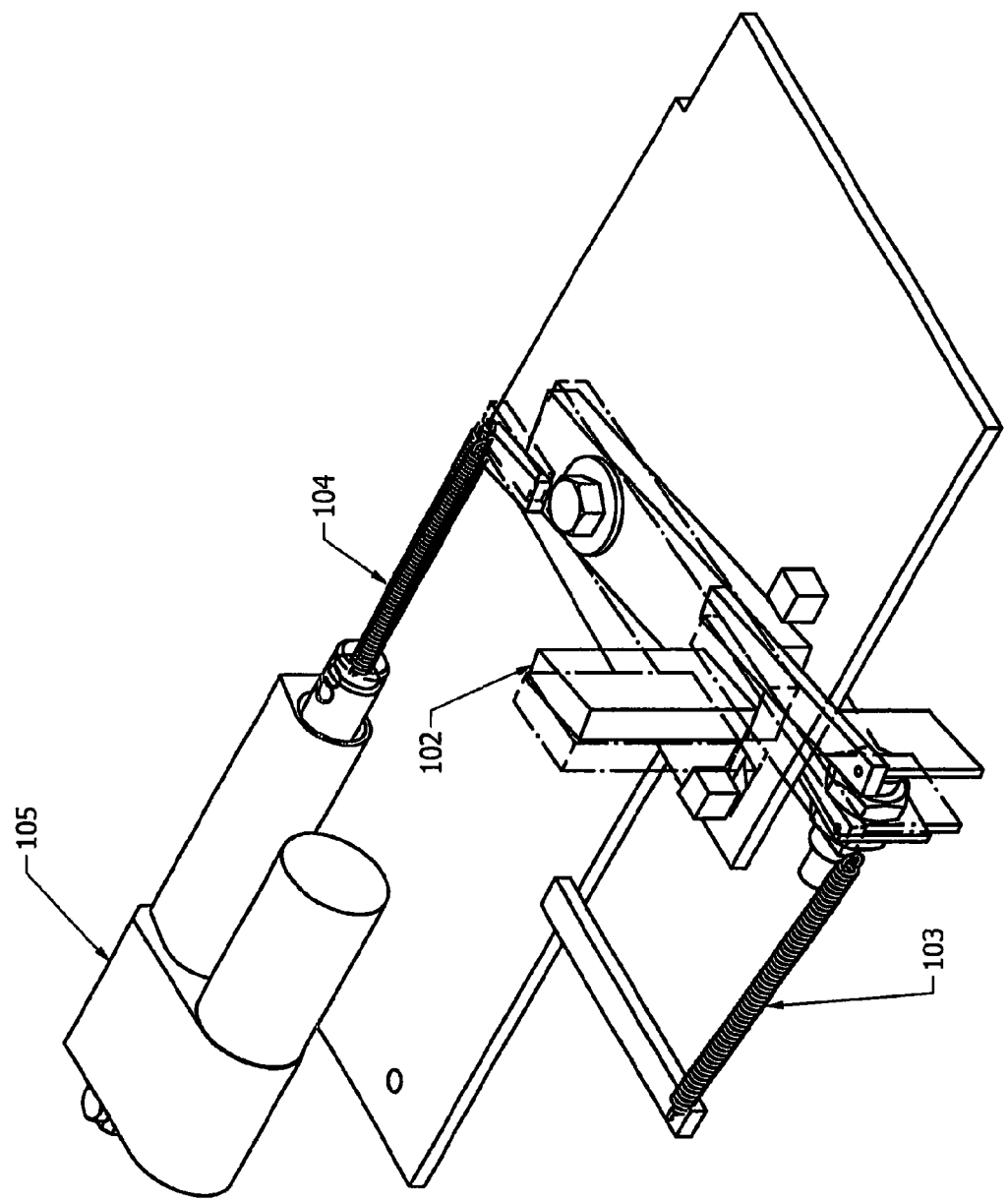
FIG. 19 is an isometric view showing a close up of the rake finger lock out device.

FIG. 19 shows a close up of the rake finger lock out device in an isometric view and shows the device that will engage the hook. The linear actuator 105 extends to allow spring 103 to pull the engaging arm 102 towards the hooked rod 100. When the hooked rod 100 is pushed up far enough the engaging arm 102 pivots and holds the hooked rod 100 up, thereby holding the rake fingers 78 back. To release the rake fingers 78, the linear actuator 105 retracts and therefore the spring 104 will over ride spring 103. Do to the fiction between lever 102 and the plate 101, the mechanism will not release until the semi cylinder 24 pushes the hooked rod 100 up, thereby reducing the fiction and allowing spring 104 to pull 102 back and allowing the hooked rod 100 to move up and down freely.

Figure 20:
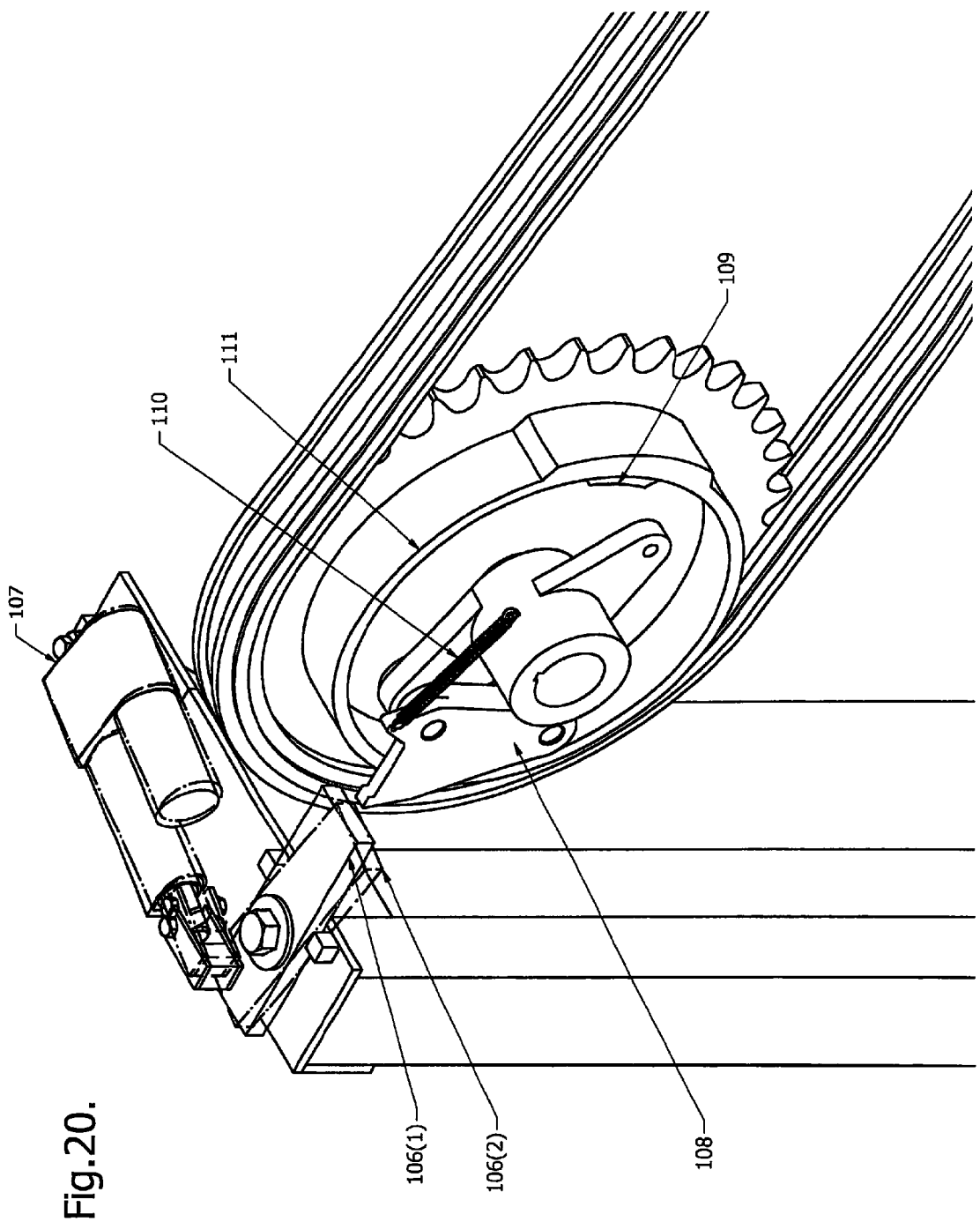
FIG. 20 is an isometric view showing the tying clutch engagement device.

FIG. 20 shows the tying clutch engagement device in an isometric view. Once the computer decides that the bale length is equal to the determined length, it sends a signal to the linear actuator 107 which retracts and pulls lever 106 from position (1) to position (2). This allows spring 110 to pull the locking follower 108 into position so that as rim 111 rotates it will lockup when the locking follower engages the stop 109, which is attached to the rim. This will force the tying shaft to rotate, thereby moving the locking follower out of the way so that the lever 106 can be pushed to its original position by the linear actuator as rim 111 rotates. Once a full revolution has been made by the tying shaft, lever 106 will engage the follower 108 and release it as it rotates. This will stop the tying shaft from rotating thereby allowing the baler to continue to form the next bale without the tying mechanism engaging until the computer determines the next bale is of the correct length.

Figure 21:
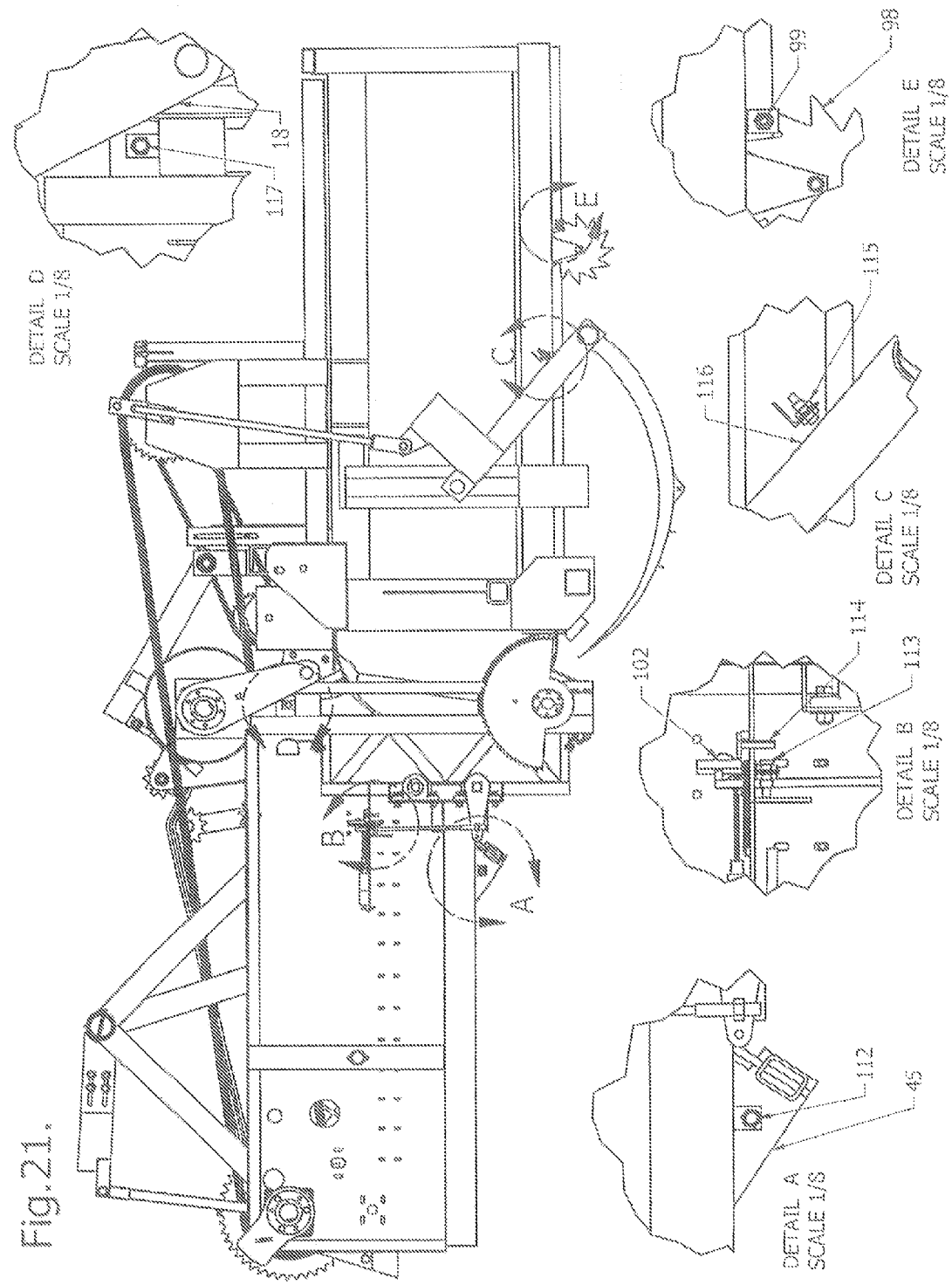
FIG. 21 is an side view showing the placement of sensors on the baler's left side.

FIG. 21 shows the placement of sensors on the baler's left side. The baler is monitored by several sensors which enable the computer to make decisions regarding the positions of the mechanisms. The flake separator sensor 112 is positioned such that when the flake separator is closed, the left flake separator arm 45 will activate the sensor. The rake finger stop sensor 113 is positioned such that when the engaging arm 102 is stopping the retraction of the rod 100, the sensor is activated by the engaging arm plate 114 which is welded to the engaging arm. The needle sensor 115 is activated by the motion of the needle arm 116; when the arm 116 is activating the sensor, the needles 54 are clear of the bale chamber 4. The semi cylinder sensor 117 is activated by the motion of the semi cylinder crank 18. When the sensor 117 is activated, the semi cylinder 24 is approximately at bottom dead center.

Figure 22:
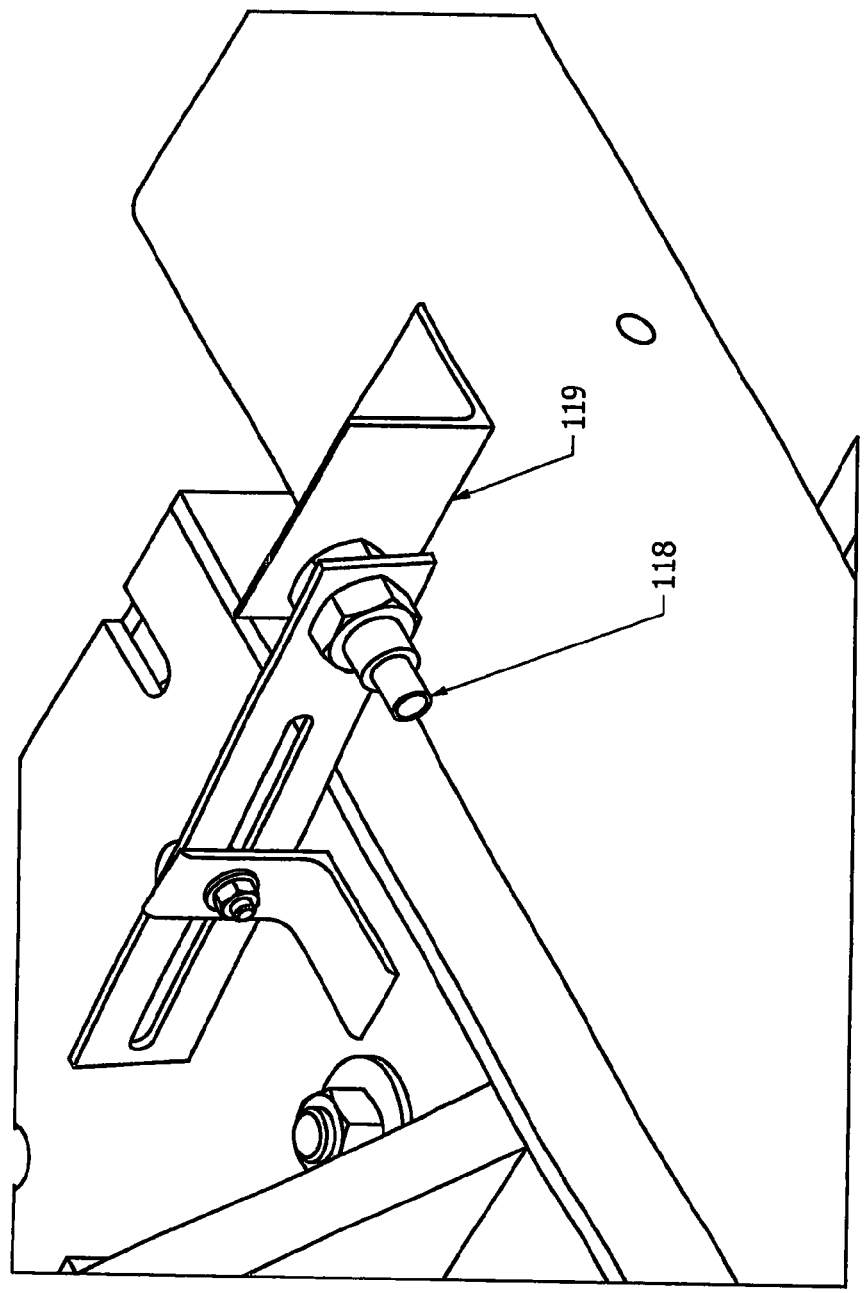
FIG. 22 is an isometric view of the flaker cart in sensor.

FIG. 22 is an isometric view of the flaker cart in sensor. The flaker cart in sensor 118 is positioned on the flaker cart such that at the flaker cart's approximate rearmost point of travel, the sensor 118 is actuated by the flaker cart in sensor plate 119, thus the computer can determine the synchronicity of the flaker cart and the semi cylinder 24.

Figure 23:
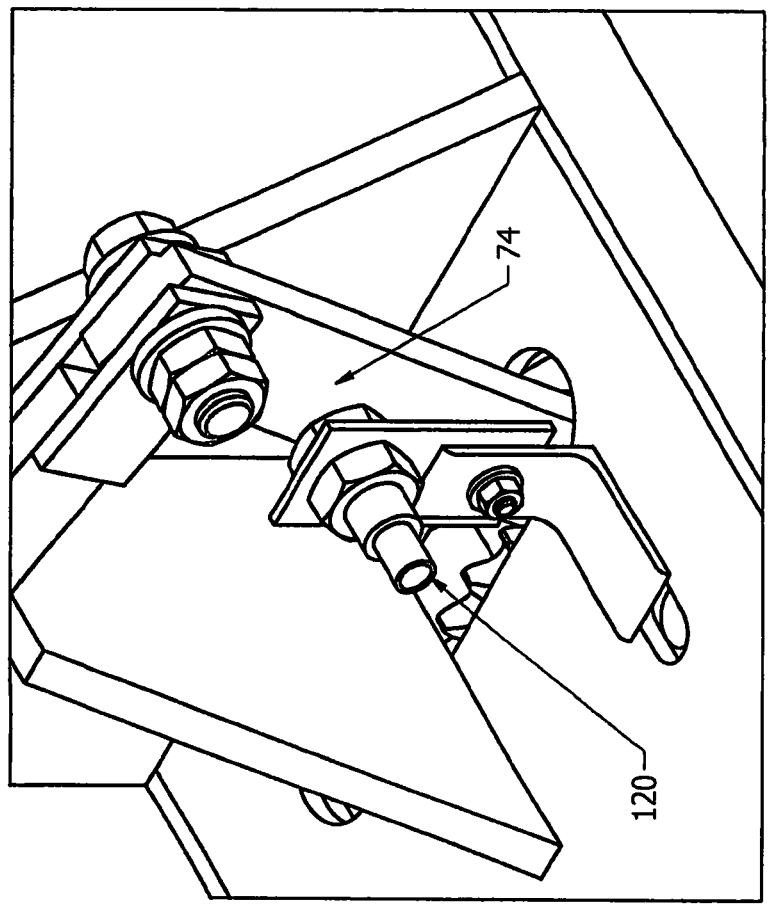
FIG. 23 is an isometric view of the flaker fingers sensor.

FIG. 23 is an isometric view of the flaker fingers sensor 120. The flaker cart finger sensor 120 is activated by the flaker finger drive lever 74. When the lever 74 is rearward, the teeth are engaged and the sensor 120 is activated by the lever 74.

Figure 24:
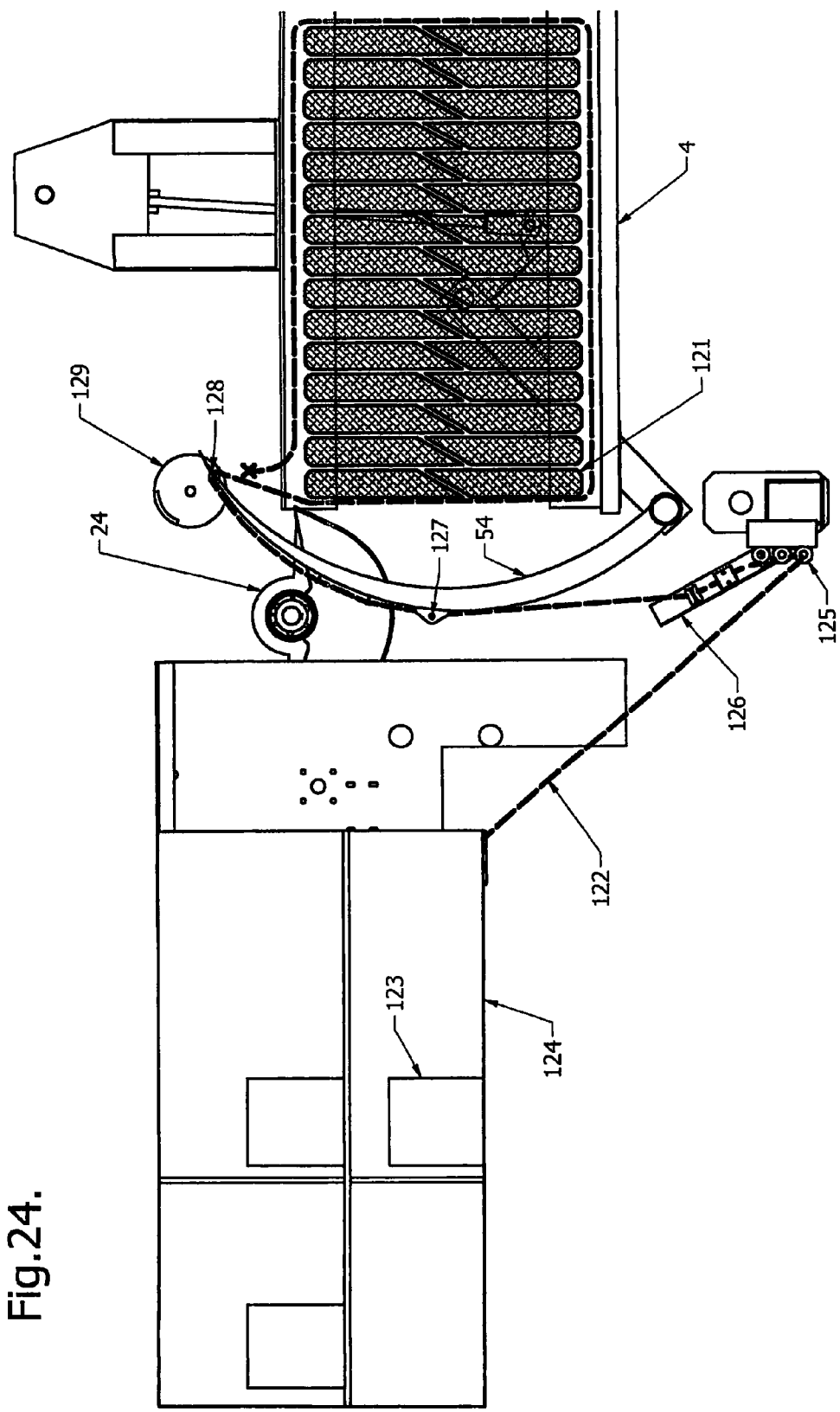
FIG. 24 is a side view showing the routing of the twine from the left twine box.

FIG. 24 shows the routing of the twine from the left twine box and shows the approximate positions of the half leaves of hay 121 in the bale chamber 4 as the bale is being formed by the cyclical movement of the semi cylinder 24. The twine 122 is fed from the twine drum 123 in the twine box 124 through the eyelet 125. From the eyelet the twine 122 is fed through the weighted twine tensioner 126, up the needle 54, through twine roller 127 and twine roller 128, and is then cut and held by the knotter 129 while hay is compressed. When the bale is of the correct length, the process is repeated and the knotter 129 ties the twine into a loop, which holds the bale in a compressed state to be ejected out the end of the bale chamber 4. The process is identical for all five strands of twine.

The twine 122 is routed similar to most single knot per bale square balers. The twine 122 comes out of spools in the twine boxes 124 and then is fed through eyelets to place the twine 122 so that the needles can place the twine 122 into the appropriate place, so the knotters can make a knot. In one embodiment, an extra eyelet is added to aid in retracting the twine as the needles 54 return to home position.

Figure 25:
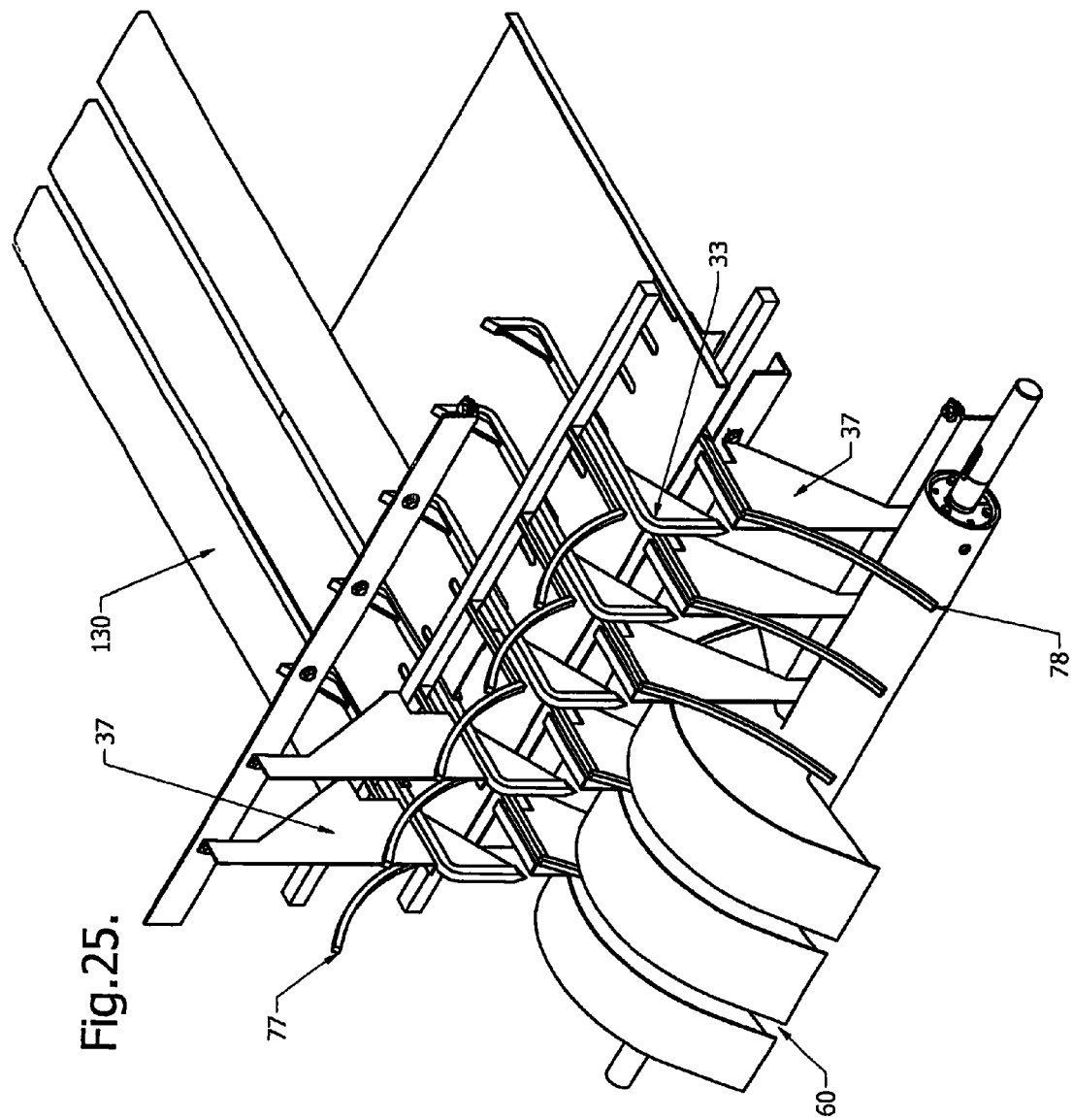
FIG. 25 is an isometric view showing the rake fingers, the flaker fingers, and the needles, as well as their placement in the grooves of the semi cylinder.

FIG. 25 is an isometric view showing the rake fingers, the flaker fingers 33, the needles 54, and their relative placement in the grooves 60 of the semi cylinder 24. As shown, the upper rake fingers 77, bottom rake fingers 78, flaker fingers 33, and rake finger pockets 37 all fit in the semi cylinder groves 60. The semi cylinder groves 60 are aligned with the slots in the continuous leaf forming chamber roof 130 and the position of the needles 54.

Figure 26:
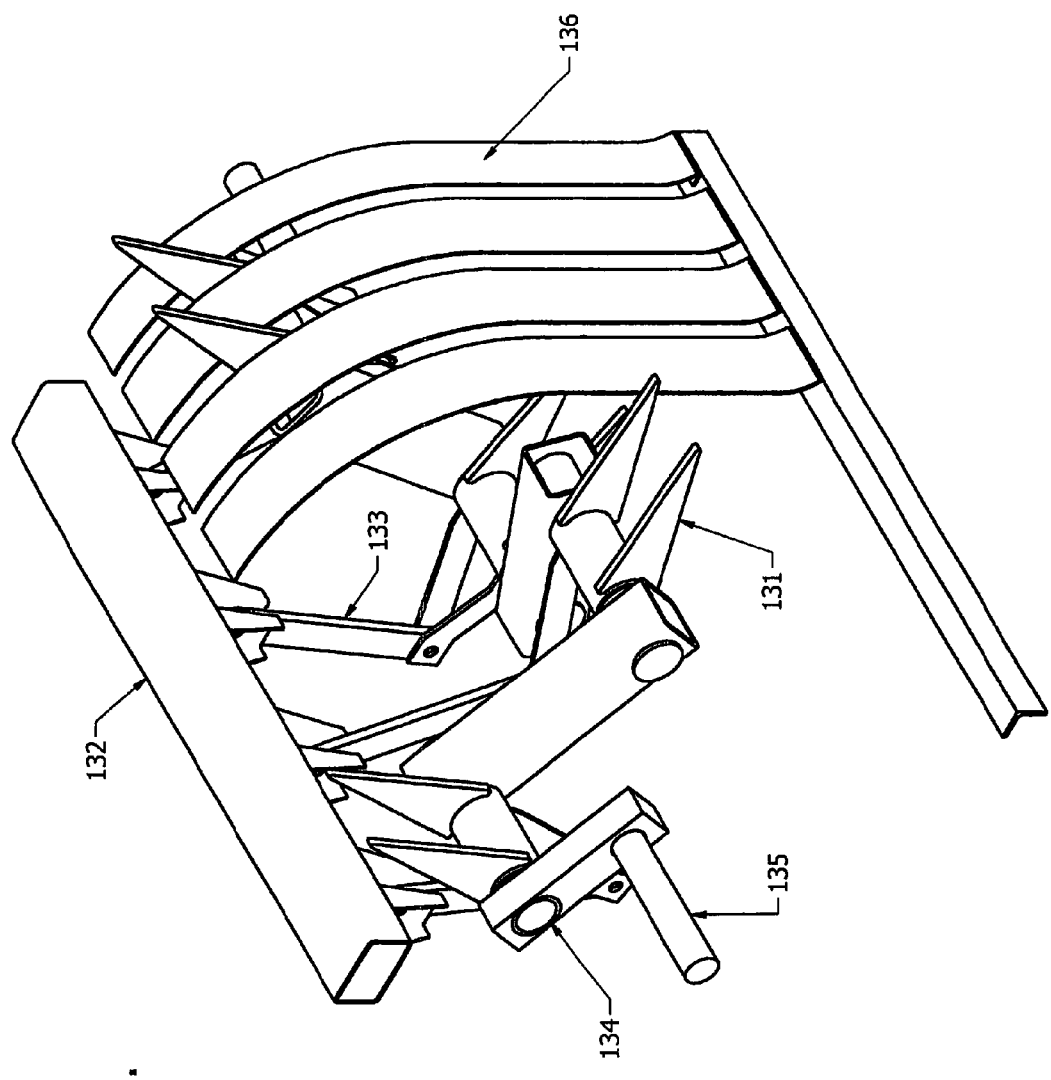
FIG. 26 is an isometric of the packer fingers mechanism.
Figure 27:
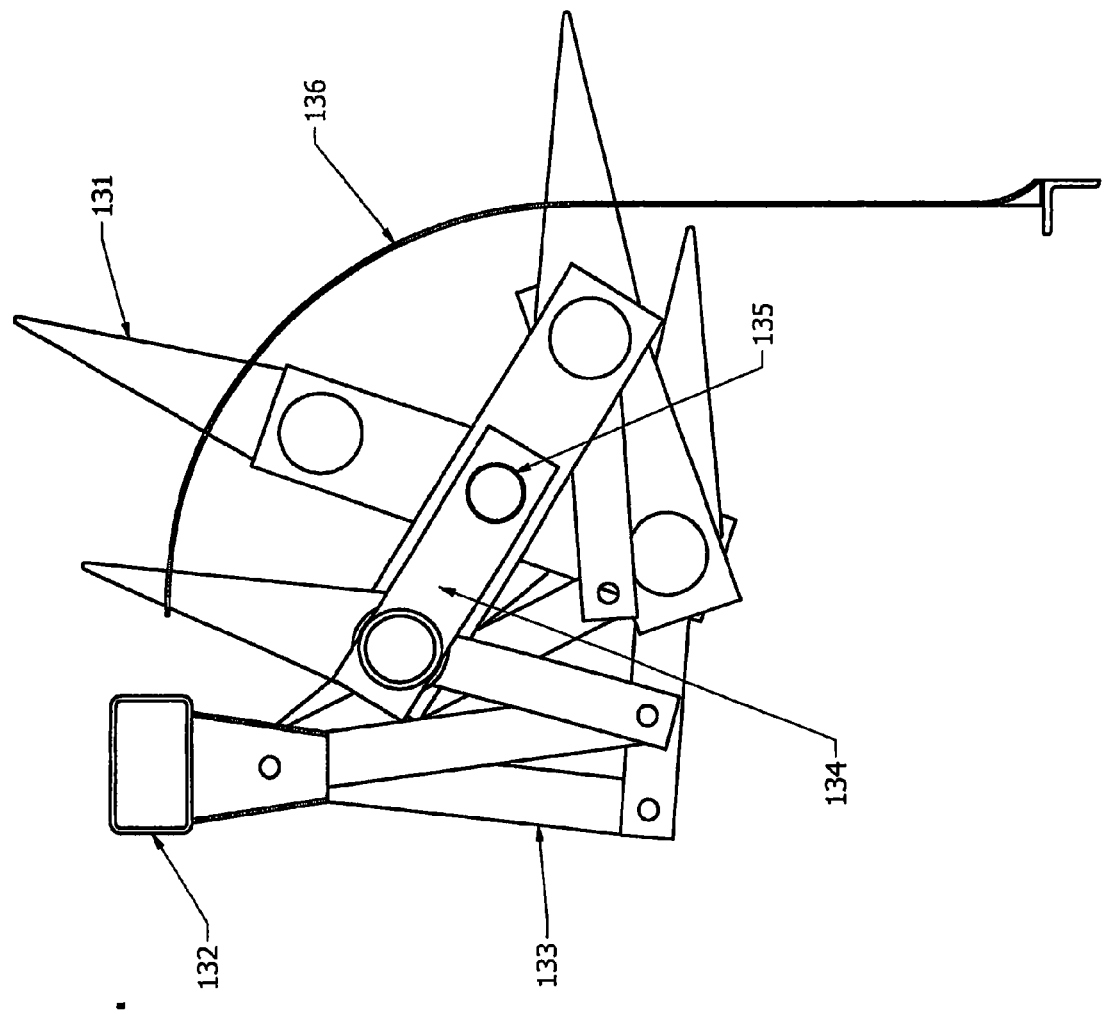
FIG. 27 is a side view showing the packer fingers mechanism.

As shown in FIGS. 26 and 27, the packer fingers 131 are driven around a complex path through the hay guides 136 to lift hay into the continuous leaf forming chamber. The fingers 131 are driven by the packer finger crankshaft 135 which rotates the packer finger crank 134. The packer finger crankshaft is driven by a chain leading from the gearbox 9. As the packer finger crank 134 rotates, the packer fingers 131 are constrained in angular motion about the packer finger crank 134 by pivot linkage 133 which is pivotally connected to pivot bar 132. The mechanism thus forces the packer finger 131 to go through an upward scooping motion following the hay guides as the packer finger crankshaft 135 is rotated counter clockwise.

In one preferred embodiment, the packer fingers push through the packer fingers hay guides near the bottom of the packer fingers hay guides and stay engaged with the hay as they are rotated upwards by the packer fingers cranks on the packer fingers drive shaft.

This invention has been described in this disclosure in various exemplary embodiments, but it will be understood by those having ordinary skill in this art that the disclosed inventions are not limited by this description. Various modifications and variations of the described embodiments may be made without departing from the scope of this invention.

I claim:

1. A square baler comprising:
a wheeled frame having a front end and a rear end, the front end having a hitch adapted for connecting the baler to a powered wheeled vehicle such that the vehicle is capable of pulling the baler through a field surface filled with crop;
the front end further comprising an inclined surface having a lower edge located near the field surface such that as the baler is pulled over the field surface the corp is forced up the inclined surface;
a preloading chamber mounted above the wheeled frame rearward of the inclined surface and forward of a baling chamber, the preloading chamber having a height which is substantially less than a height of the baling chamber, the preloading chamber being further oriented such that a midpoint of the height of the preloading chamber is located about level with a midpoint of the height of the of baling chamber;
a semi cylindrical compression roller slidably and rotably mounted on a vertical mount structure located at a front of the baling chamber, the roller having a curved face with an arc length which is substantially as long as the height of the baling chamber;
the roller being slidable between a low position near a bottom of the bailing chamber, a high position near a top of the baling chamber, and a middle position located halfway between the high position and the low position and about level with the midpoint of the height of the of baling chamber;
the roller being rotatable such that when it is located in the low position, the curved face is directed substantially vertically upward, when it is located in the middle position, the curved face is directed substantially horizontally rearward, and when it is located in the high position, the curved face is directed substantially vertically downward;
whereby as the roller is slid upwardly from the low position toward the high position while the baler is being pulled forward, the curved face rotates gradually from the upward facing direction through the rearward facing direction and to the downward facing direction, and whereby as the roller is slid downwardly from the high position toward the low position while the baler is being pulled forward, the curved face rotates gradually from the downward facing direction through the rearward facing direction and to the upward facing direction;
a feeding device adapted for moving piles of crop from the preloading chamber into the front of the baling chamber;
whereby when the roller is positioned below the middle position, the feeding device moves a first pile of crop to a location above the curved face, and then, as the roller moves upwardly, the curved face compresses the first pile of crop rearwardly and upwardly in the bale chamber; and
whereby when the roller is positioned above the middle position, the feeding device moves a second pile of crop to a location below the curved face, and then, as the roller moves downwardly, the curved face compresses the second pile of crop rearwardly and downwardly in the bale chamber.

2. The baler of claim 1, wherein the feeding device comprises a plurality of loading fingers with each of the plurality of loading fingers having a front end and a rear end, with each rear end including an angled endpiece adapted for pushing piles of crop.

3. The baler of claim 2 further comprising a cart connected to the front end of each of the plurality of loading fingers, the cart being movable between a first position located above a front portion of the preloading chamber and a second position located above a rear portion of the preloading chamber, each of the plurality of loading fingers being rotatable about a corresponding connection point with the cart;

whereby when the cart is in the first position, the angled endpiece of each of the plurality of loading fingers is rotated downwardly from a standby orientation above the preloading chamber to a use orientation within the preloading chamber;

whereby when the cart is moved from the first position to the second position, each of the angled endpieces are maintained in the use orientation;

whereby when the cart is in the second position, each of the angled end pieces is rotated upwardly from the use orientation to the standby orientation; and whereby when the cart is moved from the second position to the first position, each of the angled endpieces are maintained in the standby orientation.

4. The baler of claim 1 further comprising a lifting shaft located below the inclined ramp;

a plurality of lifting fingers attached to the lifting shaft, the lifting fingers being of sufficient length such that a distal end of each finger is capable of passing through a corresponding one of a plurality of lifting slits in the inclined ramp;

the plurality of lifting fingers being adapted for rotating about the lifting shaft, whereby as the plurality of lifting fingers rotate about the lifting shaft, the distal ends of the fingers pass through the corresponding lifting slits, such that crop forced onto the ramp by motion of the baler is lifted up of the inclined ramp into the preloading chamber by the distal ends of the lifting fingers.

5. The baler of claim 3 further comprising a separating device having a plurality of separating fingers, each of the separating fingers having a second angled endpiece; the separating device being movable from a standby position wherein the second angled end pieces are located below the rear of the preloading chamber to a use position wherein the second angled end pieces are located within the rear the of the preloading chamber;

whereby when the angled endpieces of the plurality of loading fingers move from the standby orientation to the use orientation, the separating device moves from the use position to the standby position;

and whereby when the angled endpieces of the plurality of loading fingers move from the use orientation to the standby orientation, the separating device moves from the standby position to the use position.

6. The baler of claim 1 further comprising a plurality of spring mounted upper holding fingers, each of the plurality of upper fingers having a proximal end attached to the baler at a location near the front of the baling chamber and distal end extending into an upper portion of the baling chamber;

Each of the distal ends of the plurality of upper fingers having a rest position and extended position, the positions oriented such that the extended position is located higher in the bailing chamber than the rest position;

whereby when the roller moves from the low position to the high position, the upper fingers move from the rest position to the extended position, and when the roller moves from the high position to the low position, the upper fingers move from the extended position to the rest position.

7. A baler according to claim 1 further comprising a plurality of spring mounted lower holding fingers, each of the plurality of lower fingers having a proximal end attached to the baler at a location near the baling chamber and distal end extending into a lower portion of the baling chamber;

Each of the distal ends of the plurality of lower fingers having a rest position and extended position, the positions oriented such that the extended position is located lower in the bailing chamber than the rest position;

whereby when the roller moves from the low position to the high position, the lower fingers move from the extended position to the rest position, and when the roller moves from the high position to the low position, the lower fingers move from the rest position to the extended position.

8. A baler according to claim 1 further comprising a needle have a proximal end attached to the baler and a distal end adapted for moving from a low position below the baling chamber to a high position located above the baling chamber;

a knotter located at the high position of the needle and adapted for forming knots of twine;

a sensor adapted for determining when the knotter is ready to be used for forming knots of twine based on the quantity of crop in the baling chamber;

whereby when the sensor determines the knotter is ready to be used and the roller is in the middle position and moving toward the high position, the distal end of the needle begins moving from the low position toward the high position, with the distal end of the needle rotating at twice the speed of the roller such that both the roller and the distal end of the needle reach their respective high positions at the same time, the distal end of the needle thereby delivering a piece of twine to the knotter for use in forming knots; and whereby during the down stroke of the roller that occurs as the needle is moving from its high position to the low position, the feeding device does not engage a pile of crop in the preloading chamber.

9. A baler according to claim 3 further comprising a rotating roller shaft adapted for moving the roller via rotational force of the roller shaft;

a rotating loading shaft adapted for moving the loading fingers via rotational force of the loading shaft;

a pulley system connecting the loading shaft and roller shaft and powering both in such manner that the loading shaft rotates at twice the speed of the roller shaft.

10. A baler according to claim 9 wherein the roller further comprises a plurality of grooves adapted for allowing the angled endpieces of the loading fingers to pass through the roller without contact therewith.

11. A baler according to claim 8 wherein the roller further comprises a plurality of grooves adapted for allowing the needles to pass through the roller without contact therewith.

12. A baler according to claim 1 wherein the quantity of hay in the first pile of crop and the quantity of hay in the second pile of crop are approximately equal to half a leaf of crop.

13. A baler according to claim 1 further comprising a plurality of sensors located in the baling chamber, the sensors adapted for determining the relative amounts of hay in a bottom half and a top half of the bale chamber and determining, based on these relative amounts, whether the feeding device should engage the pile of hay in the preloading chamber at earlier or later time during a forward motion of the device.

14. A method of forming a square bale of hay in a baler comprising the steps of:

moving a first pile of hay from a preloading chamber located forward of a baling chamber into a front of the baling chamber at a point of height in the baling chamber above a rotating, semi-cylindrical compression roller, the roller having a bottom position located near a base of the baling chamber and a top position located near a ceiling of the baling chamber;

lifting the roller from the bottom position to the top position and rotating the roller in such a manner that the first pile of hay is compressed upwardly and rearwardly in the bailing chamber;

moving a second pile of hay from the preloading chamber into the front of the baling chamber at a point of height in the baling chamber below the roller;

lowering the roller from the top position to the bottom position and rotating the roller in such a manner that the second pile of hay is compressed downwardly and rearwardly in the baling chamber;

moving a subsequent pile of hay from the preloading chamber into the front of the baling chamber at the point of height in the baling chamber above the roller;

lifting the roller from the bottom position to the top position and rotating the roller in such a manner that the subsequent pile of hay is compressed upwardly and rearwardly in the baling chamber;

lifting distal ends of a plurality of needles from a low position located below the baling chamber, each distal end holding a corresponding piece of twine, upwardly toward a corresponding plurality of knotters located above the bailing chamber;

timing the lifting of the distal ends of the plurality of needles with the lifting of the roller to compress the subsequent pile of hay such that the distal ends of the needles deliver twine to the corresponding plurality of knotters at approximately the same time that the roller completes the compression of the subsequent pile of hay;

lowering the roller from the top position toward the bottom position in such a manner that no hay is compressed in the bailing chamber;

lowering the distal ends of needles downwardly from the knotters toward the low position;

timing the lowering of the distal ends of the needles with the lowering of the roller in a manner such that no hay is compressed, such that the distal ends reach the low position at approximately the same time that the roller reaches the bottom position; and incorporating a plurality of grooves in the roller such that during the lifting a lowering of the needles, the distal ends pass through corresponding grooves without contacting the roller.

* * * * *